US008798017B2

(12) United States Patent
Liu et al.

(10) Patent No.: US 8,798,017 B2
(45) Date of Patent: Aug. 5, 2014

(54) HOME SERVICE INTEGRATION AND MANAGEMENT BY EMPLOYING LOCAL BREAKOUT MECHANISMS IN A FEMTOCELL

(75) Inventors: Cheng P Liu, Duluth, GA (US); Alireza Faryar, Fair Haven, NJ (US); Kurt Huber, Coral Springs, FL (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 417 days.

(21) Appl. No.: 12/623,210

(22) Filed: Nov. 20, 2009

(65) Prior Publication Data

US 2010/0128709 A1    May 27, 2010

Related U.S. Application Data

(60) Provisional application No. 61/117,005, filed on Nov. 21, 2008.

(51) Int. Cl.
*H04W 88/08* (2009.01)
*H04W 84/04* (2009.01)

(52) U.S. Cl.
CPC .................................. *H04W 84/045* (2013.01)
USPC .......................................................... 370/338

(58) Field of Classification Search
None
See application file for complete search history.

(56) References Cited

U.S. PATENT DOCUMENTS

| 2002/0181395 | A1 | 12/2002 | Foster et al. |
| 2002/0191595 | A1* | 12/2002 | Mar et al. ..................... 370/352 |
| 2003/0054795 | A1 | 3/2003 | Tamaki et al. |
| 2004/0125937 | A1* | 7/2004 | Turcan et al. ............ 379/265.02 |
| 2006/0250578 | A1* | 11/2006 | Pohl et al. ..................... 351/210 |
| 2008/0207170 | A1 | 8/2008 | Khetawat et al. |
| 2009/0046074 | A1 | 2/2009 | Shneidman et al. |
| 2009/0061821 | A1 | 3/2009 | Chen et al. |
| 2009/0098890 | A1 | 4/2009 | Vasudevan et al. |
| 2009/0100492 | A1* | 4/2009 | Hicks et al. ..................... 725/127 |
| 2009/0168766 | A1 | 7/2009 | Eyuboglu et al. |
| 2009/0268668 | A1 | 10/2009 | Tinnakornsrisuphap et al. |
| 2009/0285176 | A1 | 11/2009 | Zheng et al. |
| 2009/0311987 | A1* | 12/2009 | Edge et al. ................. 455/404.1 |
| 2010/0056144 | A1* | 3/2010 | Gallagher et al. .......... 455/435.1 |
| 2011/0038318 | A1* | 2/2011 | Parsons et al. ................. 370/328 |

OTHER PUBLICATIONS

OA dated Feb. 1, 2012 for U.S. Appl. No. 12/623,176, 22 pages.
OA dated Mar. 1, 2012 for U.S. Appl. No. 12/623,223, 15 pages.
OA dated May 31, 2012 for U.S. Appl. No. 12/623,176, 20 pages.
OA dated Jul. 9, 2012 for U.S. Appl. No. 12/623,223, 29 pages.

(Continued)

*Primary Examiner* — John Blanton
*Assistant Examiner* — Alan Lindenbaum
(74) *Attorney, Agent, or Firm* — Amin, Turocy & Watson, LLP

(57) ABSTRACT

A system and methodology that facilitates home services integration by employing a local breakout mechanism at a femto access point (AP) is provided. In particular, the system can perform mapping to provide home functions to an authorized user equipment (UE) attached to the femto AP and provide integration with one or more home services. Further, a monitoring component is employed for home monitoring and facilitates monitoring and/or controlling devices on the home Local Area Network (LAN) via the UE. Furthermore, an access management component is utilized to set, manage and implement access privileges associated with UEs authorized to access the DH LAN. In addition, shared location data is determined and utilized for location based management and/or location assistance services.

20 Claims, 19 Drawing Sheets

(56) References Cited

OTHER PUBLICATIONS

OA dated Jun. 26, 2012 for U.S. Appl. No. 12/623,237, 29 pages.
OA dated Feb. 1, 2013 for U.S. Appl. No. 12/623,237, 29 pages.
Office Action dated Oct. 1, 2013 for U.S. Appl. No. 12/623,176, 28 pages.
Office Action dated Dec. 30, 2013 for U.S. Appl. No. 12/623,237, 28 pages.

* cited by examiner

HOME SERVICE INTEGRATION AND MANAGEMENT BY EMPLOYING LOCAL BREAKOUT MECHANISMS IN A FEMTOCELL

CROSS-REFERENCE TO RELATED APPLICATIONS

This application claims the benefit of U.S. Provisional Patent Application Ser. No. 61/117,005, filed on Nov. 21, 2008, and entitled "FEMTO CELL LOCAL BREAKOUT MECHANISMS". This application is also related to co-pending U.S. patent application Ser. No. 12/623,176, filed on Nov. 20, 2009, entitled "FEMTOCELL LOCAL BREAKOUT MECHANISMS", co-pending U.S. patent application Ser. No. 12/623,223, filed on Nov. 20, 2009, entitled "SERVICE CONTINUITY DURING LOCAL BREAKOUT IN A FEMTOCELL", and co-pending U.S. patent application Ser. No. 12/623,237, filed on Nov. 20, 2009, entitled "FEMTOCELL LOCAL BREAKOUT MANAGEMENT SERVICES". The entireties of each of the foregoing applications are incorporated herein by reference.

TECHNICAL FIELD

The subject disclosure relates to wireless communications and, more particularly, to employing local breakout mechanisms at a femto access point to provide home service integration and management.

BACKGROUND

Femtocells—building-based wireless access points interfaced with a wired broadband network—are traditionally deployed to improve indoor wireless coverage, and to offload traffics from a mobility radio access network (RAN) operated by a wireless service provider. Improved indoor coverage includes stronger signal, increased bandwidth and improved reception (e.g., video, sound, or data), ease of session or call initiation, and session or call retention, as well. Offloading traffic from a RAN reduces operational and transport costs for the service provider since a lesser number of end users consumes macro RAN network over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Conventional systems that employ femtocells, transport information (e.g., data and/or voice) from a user equipment (UE) including Internet bound traffic and home network bound traffic, through a landline network to a mobility core network. The information is received at the mobility core network and the Internet bound data can be identified and routed to the Internet from the core network, while the home network bound data is directed back to the home network from the core network. This hairpin type of traffic routing can lead to significant network resource utilization and can cause congestion in the landline network and/or mobility core network. Accordingly, bandwidth utilization in the traditional approach is inefficient and can negatively impact performance and customer satisfaction.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate local breakout mechanisms at a femto access point (FAP) to reduce backhaul and/or macro network congestion. Moreover, a slave Gateway GPRS Support Node (GGSN) can be integrated within the FAP to directly route the incoming traffic from a user equipment (UE) at the FAP. In one example, Local Area Network (LAN) bound traffic can be identified and directly routed to a device and/or application on a LAN connected to the femto AP, for example, a Digital home (DH) LAN. In an aspect a UE DH agent can be employed that performs mapping to provide DH functions to the UE attached to the femto AP. Specifically, the UE DH agent can enable the UE to behave as a DH compliant device in the DH LAN.

In accordance with another aspect of the system, an integration component can be employed to facilitate integration of various services available on the DH LAN with the UE and vice versa. For example, the integration component can provide, home private branch exchange (PBX) integration, home intercom integration, home control and automation integration, etc. In addition, a monitoring component can be employed to facilitate monitoring of various devices on the DH LAN as well as monitoring attachment, detachment and/or communication of the UEs attached to the femto AP. Specifically, the monitoring component can facilitate controlling the devices on the DH LAN via the UE. In one aspect, an RUI manager can be employed to serve various web pages representing the UIs of the different devices on the DH LAN, on the UE. The user can view the web pages on the UE and interact with them to monitor and/or control devices on the DH LAN. Further, an access management component can be utilized by the femto AP to set, manage and implement access privileges associated with UEs authorized to access the femtocell.

Yet another aspect of the disclosed subject matter relates to a method that facilitates interworking between various home devices on a home LAN and the UE attached to a femto AP. The method includes detecting attachment and/or detachment of a UE to a femto AP and communicating presence and/or absence information to the home LAN. Moreover, the UE can be integrated as a DH compliant device on the DH LAN, based on access privileges associated with the UE. In an additional aspect, a methodology can be employed to determine and share location data between UEs attached to the femto AP and/or devices attached to the DH LAN. Moreover, when a UE is attached to the FAP, the location of the UE can be provided to various services (most prominently network based) as location of the FAP. Typically, the shared location information can be provided to most any location-based services, including, but not limited to emergency services (e.g., E911).

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
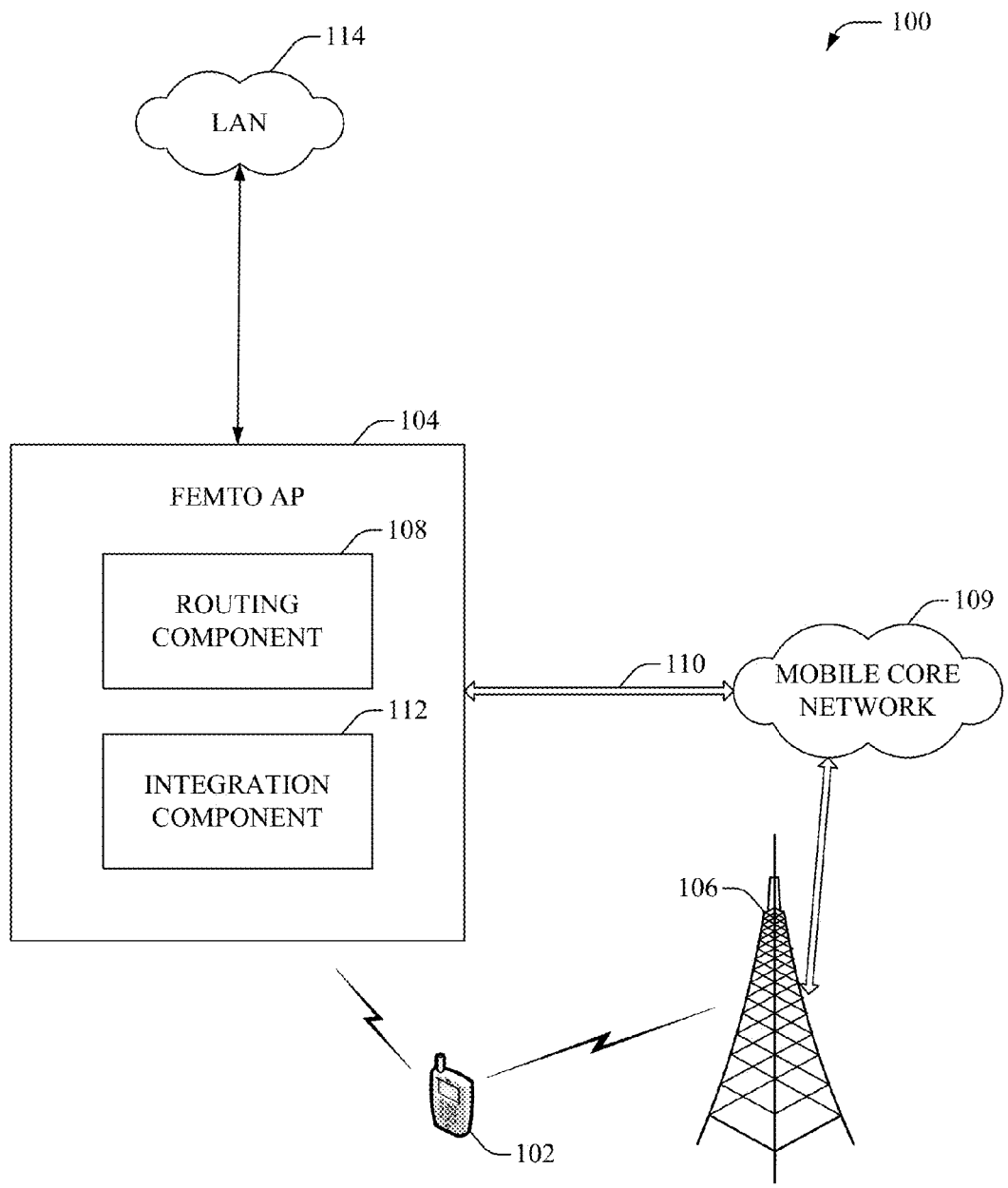
FIG. 1 illustrates an example system that facilitates Local Area Network (LAN) application integration with a femto AP.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "client," "agent," "manager," "function," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell network", and "femto network" are utilized interchangeably, while "macro cell network" and "macro network" are utilized interchangeably herein. Further, the terms "core network", "mobility core network", "mobile core network", "core mobility network", "core mobile network" and "mobility network" are utilized interchangeably herein.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell access point", "femtocell" and "femto access point" are also utilized interchangeably.

Systems and methods disclosed herein provide home service integration by employing local breakout mechanisms at a femto access point (AP). In one aspect, the disclosed system can facilitate communication between devices attached to a femtocell and devices attached to a Local Area Network (LAN), connected to the femto AP. Accordingly, LAN bound data received at the femto AP from a user equipment (UE) attached to the femto AP, can be directly routed to the LAN by breaking out the traffic at the femto AP. Thus, network congestion on the backhaul pipe and/or the macro RAN can be significantly reduced. Further, since LAN bound data is not transmitted through the core macro network, faster communication and improved performance can be achieved for the end user.

Furthermore, the disclosed systems and methods enable a UE, attached to a femto AP, for example, in a home, to initiate direct communication with an application within the home (e.g., on a home network), without hairpinning the traffic from the femtocell in the home network to the core network and back to the home network. Similarly, a home based application communicating with the UE, can initiate communication via a femto access point without traffic hairpinning. Accordingly, home LAN application integration, management and control are provided.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates LAN application integration with a FAP 104, according to an aspect of the subject disclosure. In one embodiment, a user equipment (UE) 102, can be located within a coverage area of a femto access point (FAP) 104 and can attach to the FAP 104 by employing most any attachment procedure. Typically, the UE 102 as disclosed herein can include most any communication device employed by a subscriber, such as, but not limited to, a cellular phone, a personal digital assistant (PDA), a laptop, a personal computer, a media player, a gaming console, and the like. Moreover, the UE 102 can access a mobile core network 109 through the femto network via FAP 104 and/or a macro network via base station 106. It can be appreciated that the macro network can include most any radio environment, such as, but not limited to, Universal Mobile Telecommunications System (UMTS), Global System for Mobile communications (GSM), LTE, WiMAX, CDMA, etc. The signaling and bearer technologies, for example circuit switched (CS), and/or packet switched (PS), in a femtocell and macro cell can be the same or different, depending on the radio technologies involved.

Typically, traffic flows between the FAP 104 and the mobile core network 109 and between the base station 106 and the mobile core network 109 through broadband backhaul 110 (e.g., optical fiber based technologies (e.g., Ethernet, DS3, etc.), based technologies (e.g., DSL, T1/E1 phone line, etc.), and/or coaxial cable based technologies (e.g., DOCSIS, etc.)). The FAP 104 generally can rely on the broadband backhaul 110 for signaling, routing and paging, and for packet communication. According to an embodiment, the FAP 104 can include a routing component 108 that can be utilized to facilitate efficient management of traffic to and/or from the FAP 104. Further, the FAP 104 can be operatively connected to a LAN 114. In one example, the LAN 114 can be a digital home (DH) LAN. The FAP 104 can perform most any initial setup procedure to initiate communication with the LAN 114 and connect to the LAN 114. It can be appreciated that the LAN 114 can be employed in a home, office, warehouse, hotel, store, and the like.

According to an embodiment, the routing component 108 can include a slave Gateway GPRS Support Node (GGSN). Typically, the slave GGSN can implement functionality substantially similar to functionality implemented by a GGSN in the mobile core network 109. For example, a routing functionality can be implemented by the slave GGSN to perform local breakout at the FAP 104. In addition, the slave GGSN can enable anchoring of a communication session at the routing component 108 rather than the core network GGSN (not shown). In one aspect, the routing component 108 can receive traffic (e.g., voice, data, media, etc.) from the UE 102 and/or from the mobile core network 109 (e.g., via the broadband backhaul 110), analyze the received information and determine a route for the received traffic. According to one embodiment, the routing component 108 can selectively route UE traffic away from an Iuh tunnel and send the traffic to a residential/enterprise local IP network destination, for example, via a home network, Local Area Network (LAN) 114, and/or a broadband access network (e.g., Internet) (not shown).

As an example, the routing component 108 can receive communication packets sent by UE 102 connected to the FAP 104 and can determine information associated with the received packet that can facilitate routing of the packet from the FAP 104 via the slave GGSN. As an example, the routing component 108 can check a header associated with the received packet and determine a destination address. Based in part on the determined destination address, the routing component 108 can compute an optimal route to transfer the received packet, such that, network bandwidth is efficiently utilized. Moreover, the routing component 108 can facilitate route determination based in part on a destination address, source address, type of packet, type of protocol, one or more user and/or service provider defined rules or policies and/or user preferences. Additionally, the routing component 108 can utilize load balancing mechanisms, machine-learning techniques, and/or a cost benefit analysis to generate a rout for the received packets.

According to an aspect, the routing component 108 can facilitate communication between UE 102 and a device, application or service on the LAN 114 by directly routing information between the UE 102 and the LAN 114 (e.g., without routing the traffic through the mobile core network 109). Accordingly, the UE 102 can communicate with a LAN device over the LAN 114 when UE 102 is attached to the FAP 104. It can be appreciated that when UE 102 detaches from the FAP 104, the UE 102 can maintain a connection to the LAN device via the mobility network (e.g., through base station 106). In particular, the routing component 108 can examine traffic sourced in the UE 102 to separate LAN bound, broadband access network bound and/or Internet bound traffic from the rest. A network address translation (NAT) can be performed to proxy the Internet Protocol (IP) address of UE 102 with a LAN domain IP address. The routing component 108 can then send the LAN bound IP traffic over the LAN 114. Similarly, the routing component 108 can examine traffic that sources in the LAN 114 and is destined to the UE 102. A NAT can be performed to proxy the LAN domain IP address with the IP address of the UE 102. Accordingly, the routing component 108 can deliver the traffic from the LAN 114 to the UE 102.

In addition, the FAP 104 can include an integration component 112 that can provide various services available on the LAN 114 to the UE 102 (and vice versa). For example, the integration component 112 can facilitate integration of a UE client (e.g., residing in the FAP 104 or in the UE 102) with a Public branch exchange (PBX), Intercom, and/or LAN device control and automation system. In particular, the integration component 112 can be coupled with, and manage, various clients, such as but not limited to, an IP-PBX application, an Intercom application, a device/appliance controlling client, remote control application, monitoring application, etc. Thus, the integration component 112 can facilitate integration of an application, device or service of the LAN 114, with the UE 102 attached to the FAP 104.

Figure 2:
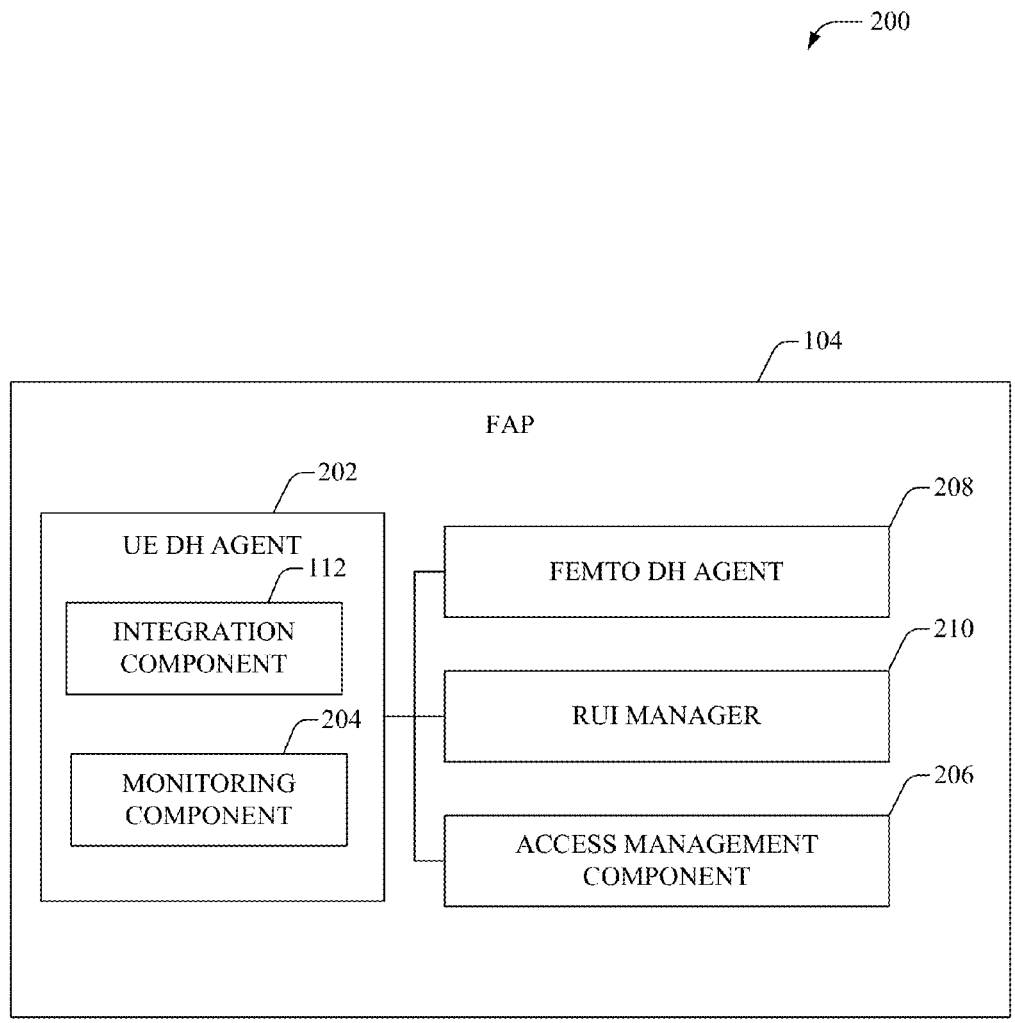
FIG. 2 illustrates an example system that can be employed to facilitate local breakout mechanisms that provide digital home (DH) LAN integration.

FIG. 2 illustrates an example system 200 that can be employed to facilitate local breakout mechanisms that provide digital home (DH) LAN integration, in accordance with an aspect of the disclosure. It can be appreciated that the FAP 104 and integration component 112 can include respective functionality, as more fully described herein, for example, with regard to system 100. Further, it can be appreciated that although the subject figure is described with respect to a DH LAN, the subject innovation is not limited to a DH LAN and most any other LAN can be employed. For example, a LAN can be a home network or an enterprise network that can be employed in an office, store, hotel, factory, warehouse, etc. Additionally, it can be appreciated that although an integration component 112, and monitoring component 204, are illustrated in system 200 to reside within the UE DH agent 202, they can alternately be externally connected the UE DH agent 202, which can reside within the FAP 104, a UE, and/or a third party entity.

In one aspect, the FAP 104 can typically include UE DH agent 202 that can facilitate communication between a UE connected to the FAP 104 and a device/application/service on a home LAN (e.g., LAN 114). Typically, the UE can include most any electronic device that can connect to a FAP 104, such as, but not limited to, mobile phones, media players, digital cameras, media recorders, laptops, PDAs (personal digital assistants), personal computers, printers, scanners, digital photo frames, Global Positioning System (GPS) module, gaming module, etc. Further, it can be appreciated the UE can be mobile, stationary, and/or have limited mobility and can be employed, for example, in a home, office, building, retail store, restaurant, hotel, factory, warehouse, etc.

According to an aspect, the UE DH agent 202 can identify when a UE attaches to the FAP 104 and can communicate the presence of the UE to one or more DH functions. Specifically, a DH Access Control List (ACL) can be maintained by the DH Agent 202 to authorize a UE for DH LAN access. In an additional or alternate embodiment, the ACL can be maintained by a management function and/or database (not shown) within the FAP 104 and can be accessed by the UE DH Agent 202, for UE authorization. The entries to the DH ACL can include information, such as, but not limited to, an ID known to the femto AP owner and the user of the visiting UE (e.g. telephone number). In another example, the network provider can remotely view and/or modify the ACL. Typically, a user interface (UI) (e.g., web page) through which the femto AP owner can add and/or delete UE IDs to/from the DH ACL can be provided by a remote user interface (RUI) manager 210. In addition, the UE DH agent 202 can identify when the UE leaves the femtocell and accordingly communicate the absence of the UE to one or more DH functions.

Moreover, the UE DH agent 202 can perform mapping to provide DH functions to the UE attached to the FAP 104. Specifically, the UE DH agent 202 can make the UE appear as a DH compliant device in the DH LAN. Various functions (not shown), residing on one of, or distributed between two of, the FAP 104, residential gateway (RG), a UE, a third party, etc., can be employed by the UE DH agent 202 to support Digital Living Network Alliance (DLNA) standards and compliant services/applications such as video or music streaming, home monitoring, etc. Other standard services (e.g., VoIP, Security, etc.) can also be supported in a similar fashion. For example, clients can include, but are not limited to a private branch exchange (PBX) client, an intercom client, a home control client, an automation client, a monitoring client, a remote control client, etc.

According to one aspect, the UE DH agent 202 can facilitate rendering an application-specific UI (e.g., generated by the RUI manager 210) on a display on the UE, by translating the UI primitives to a protocol supported by a device rendering agent of the UE. As an example, a user can interact with the displayed UI and communicate with and/or control the devices on the DH LAN, without transferring traffic over the core network. For example, the UE DH agent 202 can render a webpage (e.g., generated by the RUI manager 210) that can include information and/or interactive buttons, which enable the user to monitor and/or control devices on the DH LAN. Further, the UE DH agent 202 can provide a coherent UI across all UEs attached to the FAP 104. Moreover, the UE DH agent 202 can be a DH compliant agent working together with DH application(s) to interface the UE with various DH functions and services. In one example, the FAP 104 can instantiate one UE DH agent 202 for each UE that attaches to the FAP 104, except for those UEs, which are not authorized to access DH services. In accordance with an aspect, the UE DH agent 202 can provide an authorized UE with DH services, such as, but not limited to, Digital Rights management (DRM), Remote User Interface (RUI), Dynamic Host Configuration Protocol (DHCP), session management (SM), Universal Plug and Play (UPnP), VoIP telephony. In an additional aspect, the UE DH agent 202 can facilitate session continuity for traffic between the UE and select DH LAN services and/or devices, when the UE moves from the femtocell to the macro cell and/or vise versa.

Further, the UE DH agent 202 can include (or be operatively connected to) an integration component 112, which can reside within the FAP 104. The integration component 112 enables integration of various services available on the DH LAN with the UE and vice versa. For example, the integration component 112 can provide, home private branch exchange (PBX) integration, home intercom integration, home control and automation integration, etc. In one aspect, an Internet Protocol (IP) PBX can reside on the DH LAN. As an example, end users can have their own extension numbers, (e.g., members of a family can have their own extension number, for example, in each room). In particular, when a UE attaches to the FAP 104, the integration component 112 can enable the UE to act as the handset of the PBX system and communicate data between the UE and a disparate PBX handset by employing local breakout at the FAP 104. Accordingly, if a call is received by the PBX system, the call can be directly routed to a respective UE by the PBX system via the femto AP 104, without traversing the core mobility network. In one aspect, the integration component 112 can determine UE presence and/or absence information from the UE DH agent 202. Further, the integration component 112 can determine a PBX extension associated with the attached, authorized UE, for example, from the UE, from the PBX system and/or stored at the FAP 104. In one aspect, the UE DH agent 202 can map an existing PBX extension to the UE or can assign a designated PBX extension to the UE, as specified by a user, femtocell owner, and/or network provider.

In one example, the existing PBX extensions can be associated with an UE ID (e.g., telephone number) and the information can be stored at the FAP 104 by the owner and/or user of the FAP 104 and/or network provider (e.g., in most any database). Accordingly, for an incoming call, when a calling party dials an extension number, the integration component 112 can determine if a UE associated with the dialed extension is currently attached to the FAP 104 and can route the incoming call to the UE, directly from the FAP 104, when the UE is attached to the FAP 104. If determined that the UE associated with the extension number is not attached to the FAP 104, the incoming call can be routed to the handset associated with the extension by the PBX system. In one aspect, the integration component 112 can attach the UE to the PBX system in the home LAN and accordingly facilitate PBX communication with the UE. In an alternate or additional example, the UE can have a unique PBX extension, which can facilitate utilization of UE as a handset in the PBX system with the unique extension number, when the UE is attached to the FAP 104.

For example, when an employee enters an office his mobile phone can attach to the FAP 104 deployed in the office. The FAP 104 can be connected to a LAN in the office that can include a PBX system, for example, an IP PBX. Moreover, when an incoming call is received for the employee, and the calling party dials an extension associated with the employee, the PBX system can identify that the mobile phone associated with the employee extension is interfaced with the PBX system (e.g., by the integration component 112) and can directly route the call to the employee's mobile phone. In another example, the integration component 112 can facilitate simultaneously ringing both the mobile phone and desk phone. Accordingly, if the employee is moving around in the office and/or is away from his desk, incoming calls can still be routed to the employee's mobile phone, by employing the integration component 112. In one example, a policy (specified by user or service provider) can be provided to set preferences, for example, ring only at UE when UE is attached, ring at both UE and desk phone, etc. Moreover, an IP PBX application can run on a complaint Services Gateway in the DH LAN to provide advanced voice and video communication to the end users. In particular, the integration component 112 can facilitate registering the UE attached to the FAP 104 with the IP PBX and enabling the UE to act as an IP PBX end device that can receive and/or initiate calls from and/or to devices IP phones within the LAN and/or to other phones outside of the LAN.

Similarly, the integration component 112 can facilitate integration with an intercom system. Moreover, the integration component 112 can associate UE IDs with intercom numbers. For example, a FAP 104 user, owner, and/or network provider can define association data during setup, or at most any other time (e.g., provided by the UE on attachment). When a UE is attached to the FAP 104, the integration component 112 can facilitate utilization of the UE as an intercom handset. In one aspect, the UE can be associated with a unique number and/or can be mapped to an existing number (e.g., specified by a policy), such that communication directed to the existing number is routed to the UE by employing a local breakout mechanism at the FAP 104. As an example, the UE can be employed as an intercom handset and can make and/or receive calls over the intercom system. In particular, an intercom application can run on a complaint Services Gateway in the DH LAN, and the integration component 112, can register most any UE attached to the FAP 104 with the intercom application and enable the UE to act as an end point in the intercom system.

For example, a femtocell can be deployed in a home and an intercom number can be associated with a cell phone of each member of the family. Accordingly, when two or more authorized cell phones are attached to the FAP 104, the respective integration components (e.g., within respective UE DH agents) can facilitate communication between the cell phones by employing the intercom system, without transferring the communication though the macro network. Further, the integration component 112 can enable calls between an intercom device and a cell phone, attached to the FAP 104 by employing local breakout at the FAP 104. In addition, the cell phone of a family member, for example, a child, can be associated with an intercom device, for example, intercom device in the child's room. Accordingly, the integration component 112 can route communications directed to the intercom device in the child's room to the child's cell phone, when the child's cell phone is attached to the FAP 104 (e.g., without utilizing core network resources).

In addition, the FAP 104 can include a monitoring component 204 that can facilitate monitoring of various devices on the DH LAN as well as monitoring attachment, detachment and/or communication of the UEs attached to the FAP 104. The monitoring component 204 can maintain a log of all femtocell activity to extract information, such as, but not limited to home presence. In one aspect, the monitoring component 204 can provide UE activity information to a billing system that can prepare an appropriate bill for service charges associated with the UE. Further, in another aspect, the monitoring component 204 can enable only an authorized entity to view activity information and/or information associated with devices/applications/services on the DH LAN, for example through a UE attached to the FAP 104, without communicating via the core network. The monitoring component 204 can render a UI (e.g., generated by the RUI manager 210) on the UE that displays most any information requested by the UE.

In another example, the monitoring component 204 can also enable the entity to control the devices/applications/services on the DH LAN via the UE attached to the FAP 104. For example, an authorized user can control a device and/or appliance connected to the DH LAN via the UE, when the UE attaches to the femtocell, without transferring communication over the core network.

As an example, when a FAP 104 is deployed in a home, an authorized UE can be utilized to turn lights on and off, change thermostat settings to vary the home temperature, close a garage door, etc. Moreover, the RUI manager 210 can be employed to facilitate interworking between various home device interfaces and the UE. In one aspect, the RUI manager 210 can support most any UI protocol (e.g., DLNA), which can be mapped by the UE DH agent 202 to a UE specific protocol. It can be appreciated that the UI protocol of the RUI manager 210 can also be compatible with the UE web browser, such that mapping can be avoided. The RUI manager 210 can serve various web pages representing the UIs of the different devices on the DH LAN (e.g., in the home). The user can view the web pages on the UE and interact with them to monitor and/or control devices on the DH LAN. According to an aspect, the RUI manager 210 can receive the user entries and/or commands (e.g., interpreted by the UE DH agent 202) and can send information/commands to the device. In one embodiment, the monitoring component 204 can employ the RUI manager 210 to provide an appropriate UI to the UE and facilitate control of devices/appliances from the UE. As an example, the monitoring component 204 can employ the RUI manager 210 to display an interface, such as a remote control interface for most any device/appliance on the DH LAN (e.g., television, DVD player, music system, media player, gaming device, etc.). Accordingly, a user can utilize the UE as a remote control to modify settings of the device/appliance. For example, the user can employ the UI on the UE to change the volume of the music system and/or remotely open or close a garage door, etc.

Furthermore, the monitoring component 204 can also provide control of a UE from a device/application/service on the DH LAN. As an example, a user can manage (answer, forward, etc.) an incoming call (or any communication) from a device on the DH LAN, for example a television. Accordingly, the monitoring component 204 can provide a notification, of an incoming call for a UE attached to the FAP 104, on a television (or most any other appliance, device, etc.), for example, when identified that the user is viewing the television. Further, the monitoring component 204 can employ the RUI manager 210 to provide a UI on the television that can enable the user to directly manage the incoming call without having to walk to the UE.

In yet another aspect, the monitoring component 204 can enable a UE to remotely view output of a video camera attached to the DH LAN. For example, the camera can be associated with a home alarm, baby monitor, etc. Specifically, a UE can be equipped with a video and/or audio player, such that, the UE, attached to the FAP 104, can be utilized to remotely monitor various rooms in a house. Moreover, the output of video cameras and/or microphones located on the DH LAN can be directly routed to the UE via the FAP 104 (e.g., by employing routing component 108) and thus efficient communication can be achieved since hairpinning up and down through the access network (or radio access) and mobility core is avoided. In one aspect, the monitoring component 204 can interwork with a home monitoring application in the home (e.g., on the DH LAN) and provide the UE with a live (or recorded) video stream directly across the home LAN, without employing core network bandwidth.

Further, an access management component 206 can be utilized by the FAP 104 to set, manage and implement an access privilege associated with a UE authorized to access the femtocell. The access management component 206 can adjust the UE's privileges during setup (e.g., by querying the femtocell owner and/or network provider) and/or can dynamically adjust the privileges depending on the location of the UE in the femtocell coverage area. Typically, the ACL can be employed to associate different UEs different privileges, including but not limited to, the devices that can be accessed by the UE on the DH LAN, devices that can be controlled by the UE on the DH LAN, applications on the DH LAN that can be employed by the UE etc. Privileges can be changed automatically depending on the time of the day, day of the week, and/or based on a policy (e.g., set by a femtocell owner or network provider). Further, an administrator (e.g., a femtocell owner, authorized user, or network provider) can prohibit a UE from utilizing an application when connected to a specific location. In one aspect, the location information can be determined from a femto DH agent 208. Furthermore, the access management component 206 can instantiate UE DH agents (e.g., UE DH agent 202), for example, for each UE, or each application, or a set of UEs/applications, etc.

According to an aspect, the FAP 104 can further include the femto DH agent 208 that can be employed to authenticate the FAP 104 with the DH LAN. For example, the femto DH Agent 208 can facilitate attaching, detaching and establishing presence of the FAP 104 in the DH LAN. In addition, the femto DH agent 208 can facilitate wireline and/or wireless convergence by inter-working between the DH functions and mobility network functions. In one example, the femto DH Agent 208 can facilitate location assisted cellular services by obtaining location of the FAP 104 from a function, application, database, and/or device attached to the DH LAN 310 and providing it to a mobility location server.

In one aspect, the femto DH agent 208 can obtain location information from various sources, such as, but not limited to, location of the FAP 104 specified during deployment, location information from a server, device, application and/or service on the DH LAN. In one aspect, when the UE attached to the FAP 104 does not provide Global Positioning System (GPS) support, or the GPS functionality within the UE cannot obtain GPS co-ordinates, for example, when the UE is in a building, the femto DH agent 208 can associate location information obtained from the various sources with the UE. This location information can be provided to most any location-based services, including, but not limited to emergency services (e.g., E911).

In addition, location information, for example, GPS information, can be obtained by the femto DH agent 208 from the UE attached to the FAP 104 (e.g., when the UE supports GPS or most any other location determination functionality) and can be utilized to identify location of a disparate UE connected to the FAP 104, a server, device, application and/or service on the DH LAN. In an additional or alternate aspect, location data can be input by a user via a femto AP interface, and/or via a UE attached to the FAP 104. It can be appreciated that the user input can be verified, for example, by the network provider and/or by employing GPS co-ordinates associated with the femtocell, etc. In one example, location data can also include a physical address, such as, but not limited to a postal address, building number, suite number, floor number, etc. Further, when multiple femtocells are present in the same location, they can share GPS derived location information among them. In particular, the femto DH agent 208 can facilitate sharing of GPS information, which can be employed in timing synchronization of the femtocells. Further, the femto DH agent 208 can also provide location based Quality of Service (QoS). Additionally or alternately, the femto DH Agent 208 can provide traffic breakout information to a service provider billing system (not shown).

Figure 3:
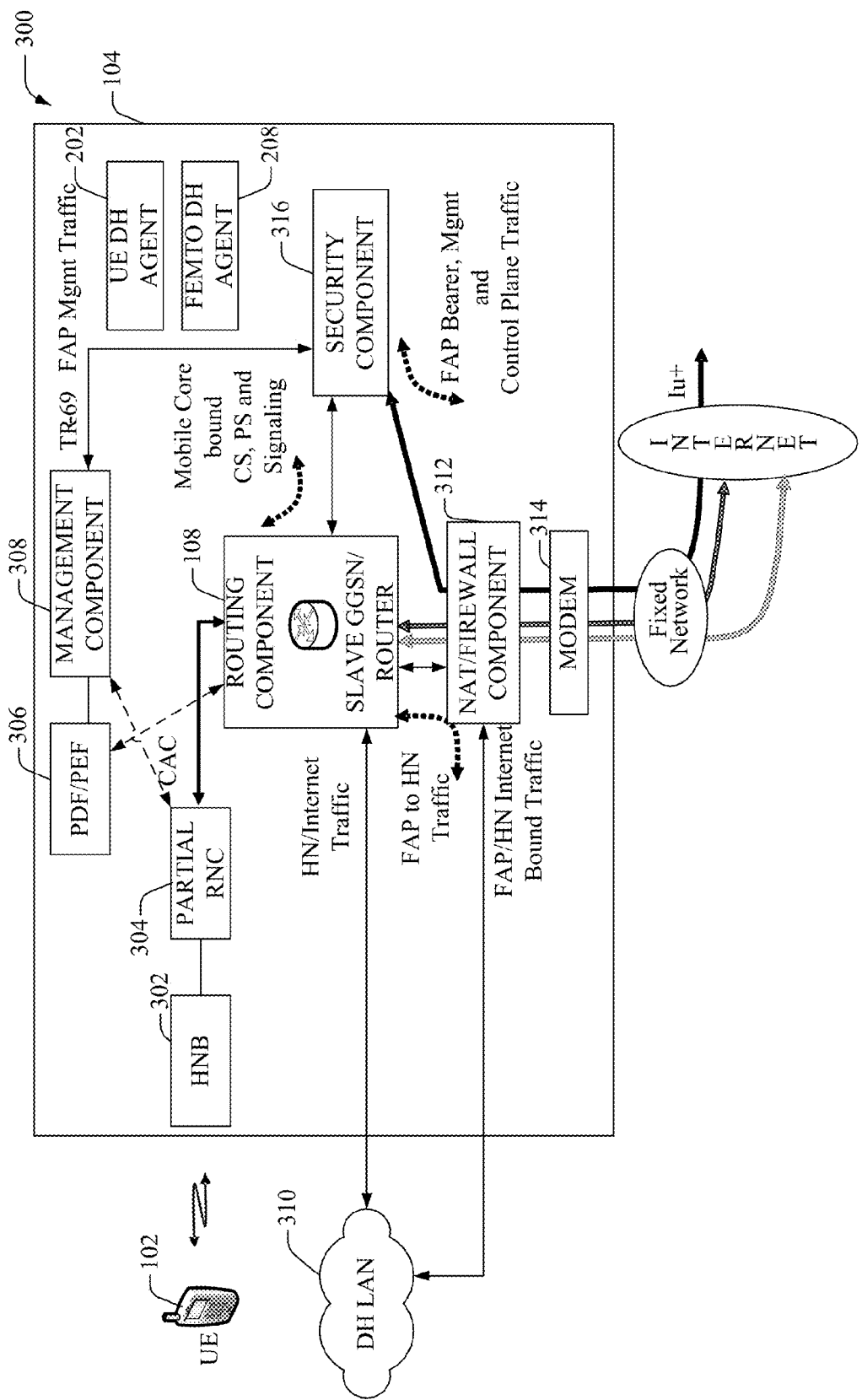
FIG. 3 illustrates an example system that can be employed to facilitate efficient routing of traffic between a UE, attached to a femto access point (AP), and a device, application or service of a DH LAN.

Referring now to FIG. 3, there illustrated is an example system 300 that can be employed to facilitate efficient routing of traffic between UE 102 and a device, application or service on a DH LAN 310, according to an aspect of the subject disclosure. It can be appreciated that the UE 102, FAP 104, and routing component 108 can include respective functionality, as more fully described herein, for example, with regard to systems 100 and 200. Although not illustrated in FIG. 3, it can be appreciated that the FAP 104 includes and/or is operatively connected to integration component 112, monitoring component 204, RUI manager 210 and/or access management component 206.

Moreover, system 300 includes a FAP 104 that can be integrated with a residential gateway (RG). Further, FAP 104 can be connected to a LAN, for example digital home (DH) LAN 310, by a wireless and/or wired connection. It can be appreciated that the DH LAN 310 disclosed herein, can be most any LAN and can be deployed in most any area, such as but not limited to, a house, an office, a building, a warehouse, a store, a restaurant, a hotel, a factory, etc.

Typically, the FAP 104 can receive communications from a UE 102. The UE 102 can be most any wireless communication device employed by a user, for example, a cellular phone, a gaming module, a television, a projector, personal computer, etc. Moreover, the UE 102 can utilize various technologies for terrestrial wireless communication, for example, an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), a 3GPP2 Evolution Data Only (EVDO) system, 3GPP Long Term Evolution (LTE), or Ultra-broadband Mobility (UMB); advanced 3G; or a fourth generation (4G) technology such as for example Long Term Evolution (LTE) Advanced. Additionally, a UE 102 can consume satellite-based traffic such as data originated from GPS, GLONNAS, or Galileo systems, conveyed through a deepspace link (not shown).

In one aspect, the Home Node B (HNB) 302 can receive communication from the UE 102 and can perform Node-B radio functions such as, but not limited to scheduling. Further, a partial Radio network control (RNC) 304 can be employed to perform Radio Resource Control (RRC), radio bearer (RB)/radio access bearers (RABs), radio access network (RAN) quality of service (QoS), call admission control (CAC)/Power/Congestion control, and the like. In accordance with an aspect, a routing component 108 can locally break out Home Network bound traffic at the FAP 104. In one aspect, the routing component 108 can include a slave GGSN. Moreover, information packets received from the UE 102 can be analyzed by the routing component 108 and a route to transfer the packets can be determined. In one example, the routing can be based in part on a destination address, source address, type of packet, type of protocol, one or more user and/or service provider defined rules or policies and/or user preferences.

According to an embodiment, a Policy Decision/Policy Enforcement Function (PDF/PEF) 306 can be employed to drive the selection of the route and/or other operations of the FAP 104. The PDF/PEF 306 can include multiple policies that can be specified, for example, by a service provider through a management component 308. The management component 308 can be employed to facilitate FAP management (FAP white list, policy rule updates, Ethernet/IP port management, FAP firmware updates, GSN routing function management, performance and/or alarm status update, etc.). Further, after authenticating FAP 104, the management component 308 can download configuration information (e.g., service provider policies, rules, definitions) and parameters that can facilitate connection with the core network elements (e.g., GGSN).

In one embodiment, the management component 308 can provide an interface that enables a mobility network operator/service provider/mobility network element to control the local breakout mechanism, for example, by specifying policies in the PDF/PEF. In one example, the management component 308 can also provide mobility network operator/service provider/mobility network element with an override functionality. Moreover, the mobility network operator/service provider/mobility network element can utilize the override functionality to stop local breakout at most any time and/or for a specified time period. Specifically, the override functionality can be employed by a service provide upon legal request and/or for security purposes. For example, a legal/security request can be made (e.g., by a government agency) to monitor communication through a particular FAP and the service provider can utilize the management component 308 to override the breakout mechanisms employed at the FAP, such that all communication at the FAP can be transferred via the mobility network. Moreover, the management component 308, in response to the override command, can disable breakout functionality at the routing component 108 and/or create a policy, which ensures that local breakout is not performed at the FAP 104.

The routing component 108, based in part on factors, such as but not limited to, the analysis, service provider policies, etc., identifies an optimal route for traffic received at the FAP 104. In one example, when traffic is received from the UE 102, the routing component 108 can identify whether the traffic should be routed to the macro network, via the Iu tunnel, or to a device on the DH LAN 310. Based on the determination, the routing component 108 can deliver the traffic via the identified route. In another example, the routing component 108 can receive traffic from the device on the DH LAN 310 and can determine an optimal route (e.g., to UE 102, or macro network, etc.) for the traffic, for example, by employing one or more policies in the PDF/PEF 306, and/or information from the integration component 112, monitoring component 204 and/or access management component 206 (FIG. 2) and route the traffic via the optimal route.

According to an embodiment, the FAP 104 can include a UE DH agent 202 that can facilitate communication between UE 102 and a device on the DH LAN 310. In one aspect, the UE DH agent 202 can communicate the presence and/or absence of the UE 102 to the DH functions. As discussed supra, the UE DH agent 202 can perform a mapping to provide DH functions to the UE 102, for example, by utilizing an integration component 112, a monitoring component 204, a RUI manager 210 and/or a management component 206 (FIG. 2). In one aspect, the UE DH agent 202 can utilize the RUI manager 210 (FIG. 2) to render an application-specific UI on a display on the UE 602. Moreover, a user can interact with the displayed UI and communicate with, monitor, and/or control the devices on the DH LAN 310.

Further, the FAP 104 can include a femto DH agent 208 that can be employed to authenticate the FAP 104 with the DH LAN 310 by performing an attaching procedure, detaching procedure and/or establishing presence of the FAP 104 in the DH LAN 310. In one example, the femto DH Agent 208 can facilitate location assisted cellular services by obtaining location of the FAP 104 from a function, application, database, and/or device attached to the DH LAN 310, a UE (e.g., UE 102) attached to the FAP 104, and/or location information stored during deployment of FAP 104. The femto DH agent 208 can facilitate sharing of the obtained location information between a disparate function, application, database, and/or device attached to the DH LAN 310, and/or a disparate UE (e.g., UE 102) attached to the FAP 104, and providing the obtained location information to a mobility location server.

Furthermore, according to an embodiment an access privilege (e.g., stored in the access management component 206) associated with UE 102 can be dynamically updated and/or modified based in part on various factors, such as, but not limited to, the location of the UE 102, access list information, date or time, etc. The femto DH agent 208 can determine the location of the UE 102 and accordingly facilitate location-based privileges and/or access, such that access to a set of devices/services/functions/applications on the DH LAN 310 can be restricted based on the location of the UE. As an example, a UE can provide precise (e.g., by employing a GPS system) to the femto DH agent 208, which can determine the privileges of the UE at that location.

Additionally or alternately, a Network address translation (NAT)/Firewall component 312 (e.g., IPv4) can be employed to map network address information in packet headers that can be routed via the backhaul network and/or the home network. Typically, the RG can provision the femtocell with an IP address when the femtocell attaches to the home network, for example DH LAN 310. When the routing component 108 determines that the traffic (e.g., from UE 102) can be routed to the DH LAN 310, the NAT/Firewall component 312 can employ a NAT function to proxy the IP address of UE 102 in a packet header, with a home network domain IP address in the DH domain. Similarly, when the routing component 108 determines that the traffic (e.g., from DH LAN 310) can be routed to the UE 102, the NAT/Firewall component 312 can utilize a NAT function to proxy the home domain IP address with the IP address of the UE 102.

Further, the NAT/Firewall component 312 can employ a firewall for intrusion detection and/or prevention between mobility network and home/enterprise network traffic and vice versa. It can be appreciated that the firewall can be hardware, software, or a combination thereof. In one example, a modem 314 (DSL or most any broadband modem) can be employed for transmission of packets through the backhaul network to the macro RAN. Furthermore, the FAP 104 can include a security component 316 that can utilize most any encryption technique for secure channel set up and/or tear down and/or encryption of outbound traffic. For example, the security component 316 can perform encryption for establishing the Iu tunnel.

Figure 4:
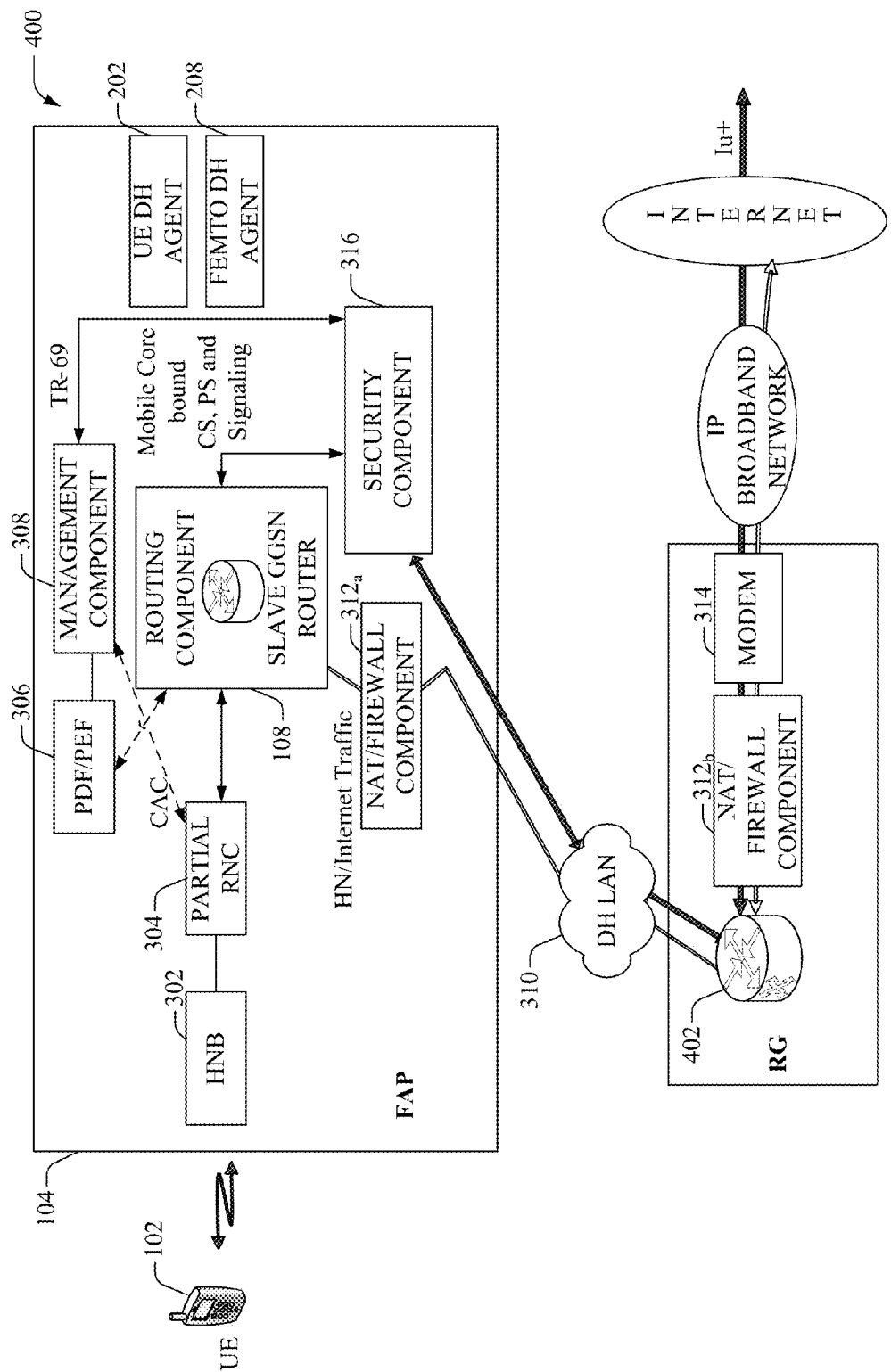
FIG. 4 illustrates an example a DH femtocell architecture that facilitates home service integration and management, wherein a residential gateway (RG) can be externally connected to a femto AP.

Referring to FIG. 4, there illustrated is an example a DH femtocell architecture 400 that facilitates home service integration and management, wherein a RG 402 is externally connected to a FAP 104, according to an aspect of the subject specification. It can be appreciated that the routing component 108, UE 102, HNB 302, Partial RNC 304, PDF/PEF 306, management component 308, security component 316, DH LAN 310, modem 314, UE DH Agent 202, femto DH Agent 208 and FAP 104 can include functionality, as more fully described herein, for example, with regard to system 100, 200 and 300. Typically, the RG 402 can be integrated within the FAP 104, as shown in FIG. 3 or can be externally connected to the FAP 104, as shown in FIG. 4 according to an aspect of the subject disclosure. However, it can be appreciated that the working and implementation of systems 300 and 400 can be substantially similar. Further, although not illustrated in FIG. 4, it can be appreciated that the FAP 104 includes and/or is operatively connected to integration component 112, monitoring component 204, RUI manager 210 and/or access management component 206, described in detail with respect to FIG. 2.

As discussed previously, the routing component 108 can route traffic directly between UE 102 and the DH LAN 310. According to an aspect, a NAT/Firewall component $312_a$ can be employed to perform network address mapping for information in packet headers that are routed via the DH LAN 310, for example by employing a NAT function. Additionally, when the routing component 108 determines that the traffic (e.g., from DH LAN 310) can be routed to the UE 102, the NAT/Firewall component $312_a$ can employ a NAT function to proxy the DH LAN domain IP address with the IP address of the UE 102. In one aspect, a RG 402 can be utilized to direct traffic to the mobility network through the backhaul network backbone.

Figure 5:
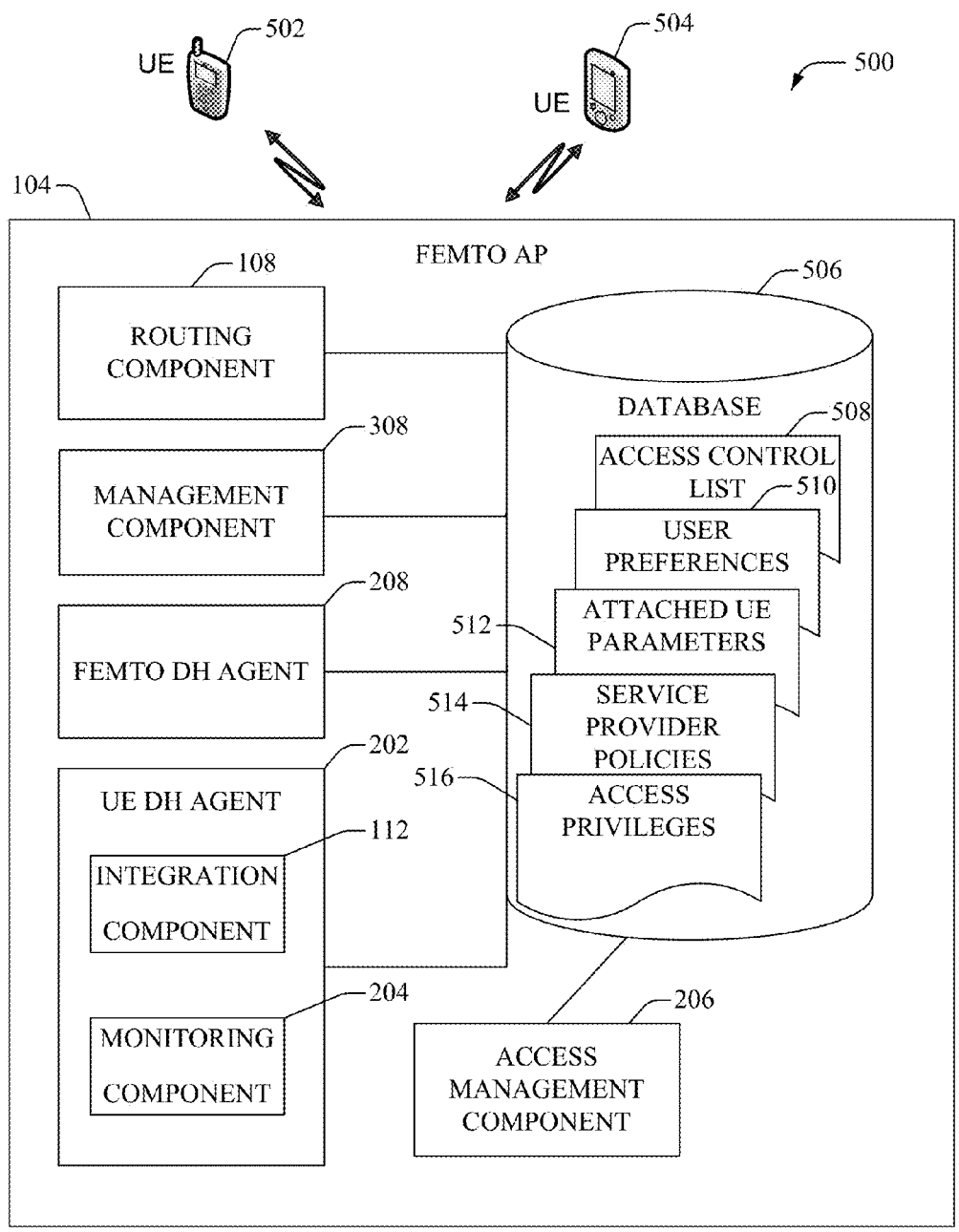
FIG. 5 illustrates an example system that facilitates restricting local breakout within a femtocell based on UE profile data.

Referring to FIG. 5, there illustrated is an example system 500 that facilitates restricting local breakout within a femtocell based on UE profile data in accordance with an aspect of the subject disclosure. It can be appreciated that the routing component 108, management component 308, femto DH agent 208, UE DH agent 202, integration component 112, monitoring component 204, access management component 206, and FAP 104 can include functionality, as more fully described herein, for example, with regard to system 100, 200, 300 and 400. Further, it can be appreciated that although only two UEs (502, 504) are illustrated in system 500, N number of UEs can be connected to the femto access point, wherein N is a whole number from zero to infinity. Typically, N can be defined by a service provider in a manner such that femto network bandwidth is utilized efficiently.

One or more UEs (502, 504) can attach to the FAP 104 when the UEs (502, 504) are within the coverage area of the FAP 104, for example, by employing most any attachment procedure. It can be appreciated that the FAP 104 can utilize an authentication and/or authorization technique to prevent unauthorized attachments. For example, the FAP 104 can manage access to femtocell services through access control list(s) 508, e.g., white list(s) or black list(s). Such access control list(s) 508 can be configured through various apparatuses and in various modes, e.g., interactively or automatically, which facilitates access management of access to femtocell coverage. As an example, white list(s) includes a set of UE identifier numbers, codes or tokens, and can also include additional fields that can contain information respectively associated with communication devices to facilitate femtocell access management based at least in part on desired complexity; for example, an additional field in a white list can be a logic parameter that determines whether an associated identifier is available for dissemination across disparate white lists. Values of attribute fields that determine white list(s), black list(s), or white list profile(s) can be generated through various sources (e.g., by femtocell owner, network provider etc.). The management component 308 can facilitate generation and maintenance of white list(s), black list(s), or white list profile(s). Specifically, the management component 308 can be employed to create, update and/or delete information that facilitates routing and/or authentication, which can be stored in database 506.

Although database 506 is shown to reside within the FAP 104, it can be appreciated that database 506 can be a local, a remote, and/or a distributed database. The database 506 can be employed to store information such as, but not limited to, access control list 508, user preferences 510, attached UE parameters 512, service provider policies 514 and/or access privileges 516. The service provider policies 514 can typically include one or more policies associated with routing and/or breakout at the FAP 104, and/or the PDF/PEF that can drive the selection of an optimal route, for example, by the routing component 108. Further, the attached UE parameters 512 can provide a list of currently attached UEs (502, 504) and can typically include information (e.g., device ID, SIM, USIM, a mobile number, etc.) associated with the UEs (502, 504) that are currently attached to the FAP 104. In one example, the user preferences 510 can be set, modified and/or deleted by an authorized user, for example, a femtocell owner. Additionally, the service provider policies 514 can be created and/or updated by the service provider, for example, remotely, at most any time, including, but not limited to, periodically, during setup, dynamically, on demand, etc.

According to an aspect, the femto DH agent 208 can determine location data, as discussed above, which can be stored in the database 506 and can be shared between UEs connected to the FAP 104 and/or devices on the DH LAN. The location data can be utilized by most any location based services (e.g., E911). Further, the database 506 can store access privileges 516 that can be created and/or modified by the access management component 206. The access privileges 516 can be set for most any authorized UE and in one aspect, can be dynamically adjusted depending on the location of the UE (e.g., determined by the femto DH agent 208). For example, the access privileges 516 can facilitate prohibiting a UE from utilizing an application, service and/or function of the DH LAN when connected to a specific point.

According to an embodiment, white lists and/or black lists can be employed provide different privileges to different UEs. Additionally, the access privileges 516 can be changed (automatically and/or manually) depending on the time of the day, day of the week, a user preference 510, and/or a service provider policy 514. As an example, the access privileges 516 can specify the devices, applications, functions, and/or services of the DH LAN that a UE is authorized to access. Further, the access privileges 516 can indicate the type of access, for example, viewing, modifying, controlling, etc., provided to a UE for each of the devices, applications, functions, and/or services of the DH LAN. Furthermore, the access privileges 516 can also store information that specifies which UEs can a device, application, function, and/or service of the DH LAN communicate with, for example, by employing local breakout at the FAP 104. Moreover, the integration component 112 and/or the monitoring component 204 utilize the data stored within the database 506, including, but not limited to, the access privileges 516 to facilitate home service integration, monitoring and/or control.

It can be appreciated that the database 506 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 6:
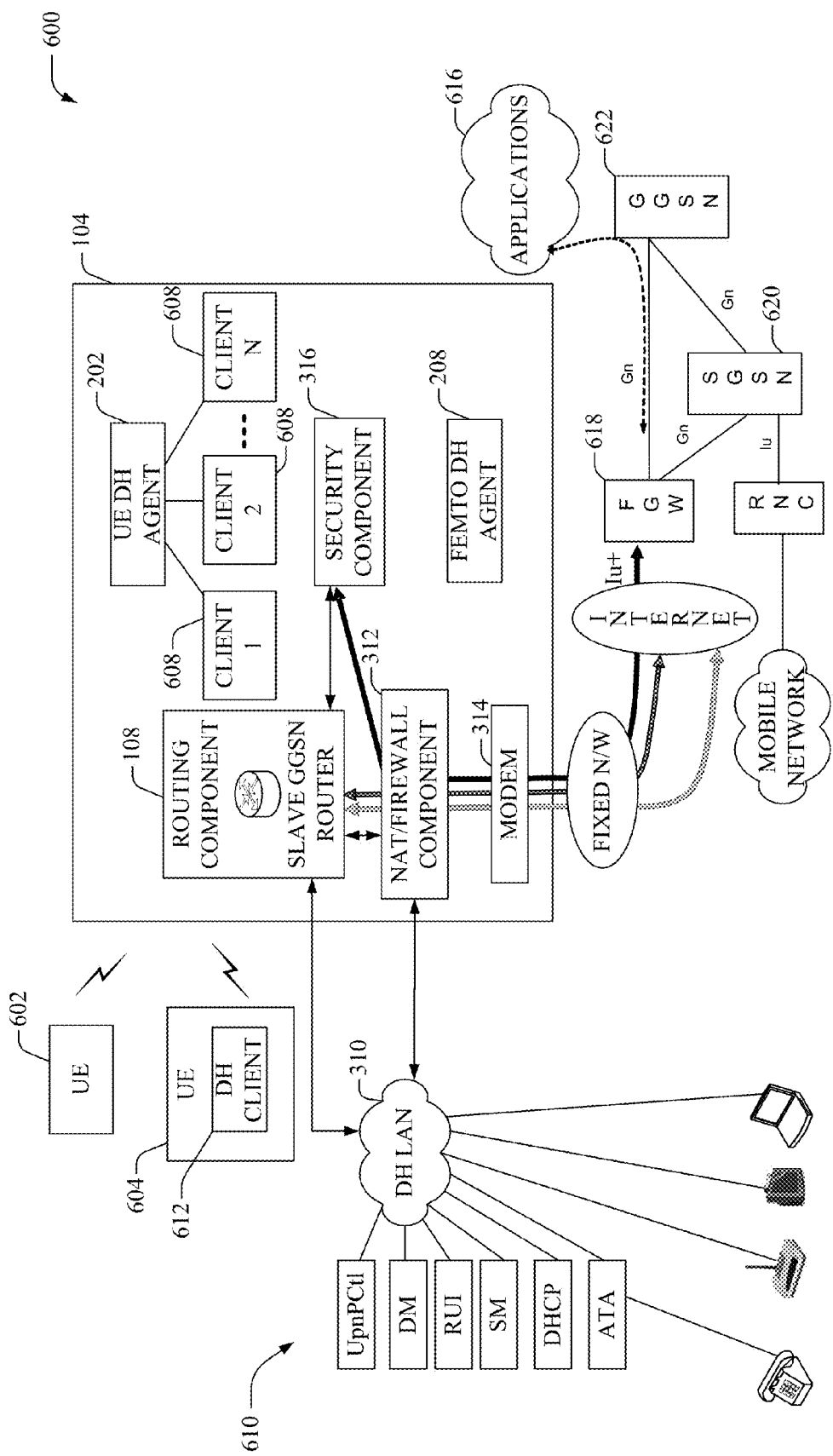
FIG. 6 illustrates an example system that provides home services integration with a femtocell, according to an aspect of the subject disclosure.

FIG. 6 illustrates an example system 600 that provides home services integration with a femtocell, according to an aspect of the subject disclosure. Typically, system 600 can include a FAP 104 that can comprise an integrated (as shown in FIG. 3) or external RG (as shown in FIG. 4). It can be appreciated that the routing component 108, NAT/Firewall component 312, modem 314, security component 316, UE DH agent 202, femto DH agent 208 and FAP 104 can include functionality, as more fully described herein, for example, with regard to system 100, 200, 300, 400 and 500. Additionally, it can be appreciated that FAP 104 can include components (e.g., integration component, access management component, monitoring component, RUI manager, HNB, partial RNC, management component, PDF/PEF, etc.) as illustrated in FIGS. 2-4 and described herein with respect to systems 200, 300 and 400.

According to an embodiment, the routing component 108 can facilitate communication between a UE (602, 604) and one or more devices 606 on the DH LAN 310 without transferring the communication to the core network. Typically, device 606 can be most any device on the DH LAN 310, such as, but not limited to, a telephone, a printer, a laptop, an appliance, a television, a projector, a gaming module, music player, etc. Thus, the UE (602, 604) can join the DH LAN 310, without supporting a dual mode wireless/Wi-Fi functionality. Moreover, the routing component 108 can identify communication directed to a device on the LAN and route the communication directly to the destination via the DH LAN 310.

Further, a UE DH agent 202 is included within the FAP 104 that can facilitate communication between UE 602 and a device 606 on the DH LAN 310. Moreover, the UE DH agent 202 can identify attachment and/or detachment of a UE 602 with the FAP 104 and can communicate the presence and/or absence of the UE 602 to the DH functions 610 and/or device 606. According to an aspect, the UE DH agent 202 can perform mapping to provide DH functions 610 to the UE 602 and make the UE 602 appear as a DH compliant device in the DH LAN 310.

According to one aspect, the UE DH agent 202 can include clients 1-N (608) that can facilitate integration with a DH LAN service, function and/or application. The clients 608 can be service and/or feature specific and can facilitate direct communication between the UE 602 and a device, service, function and/or application of the DH LAN 310 without utilizing core network resources. For example, client 1 can be a PBX client; client 2 can be an intercom client, etc. Moreover, the clients 608 can facilitate communication between the UE 602 and a device, service, function and/or application of the DH LAN 310 by making the UE 602 appear as a compliant device. As an example, the PBX client can enable the UE 602 to act as a handset of the PBX system in the DH LAN 310, and/or the intercom client can enable the UE 602 to act as a handset for the intercom system in the DH LAN 310. Specifically, the PBX client can register with the PBX, for example, IP PBX and make the UE 602 appear as an IP PBX end device that can receive and/or initiate calls from and/or to devices IP phones within the DH LAN 310 and/or from/to other phones outside of the DH LAN 310. In another example, the intercom client can register with an intercom application and/or system and make the UE 602 act as an intercom end point when the UE 602 is served by the home femtocell. Similarly, a monitoring client can be employed to facilitate interworking between the UE 602 and a monitoring application, for example, which enables video and/or audio streaming to/from the UE 602.

In an aspect, the UE DH agent 202 can interface an authorized UE 602 with DH functions 610, such as, but not limited to, Digital Rights management (DRM), Remote User Interface (RUI), Dynamic Host Configuration Protocol (DHCP), session management (SM), Universal Plug and Play (UPnP), Analog Terminal Adapter (ATA). Moreover, the UE DH Agent 202 can offload traffic to the broadband access network and can route signaling and/or media to and/or from the DH LAN 310 in an efficient manner, avoiding hairpinning (e.g., tromboning). In an additional aspect, the UE DH agent 202 can facilitate session continuity for traffic between the UE 602 and select DH LAN functions 610 and/or devices 606, when the UE 602 moves from the femtocell to the macro cell and vise versa.

It can be appreciated that the UE DH agent 202 can be located within the femtocell and/or can be located within a UE, for example the DH client 612 in UE 604. In particular, the DH client 612 can include functionality substantially similar to that of the UE DH agent 202. Moreover, the DH Client 612 can be a device-specific Digital Home compliant client, residing in the UE 604, for delivering DH services to the UE 604. It can be appreciated that although only one DH client 612 is illustrated in UE 614, one or more DH clients may reside in UE 604, each with the same or different functionality. In one aspect, the DH Client 612 can enhance user experience beyond that which can be provided with the UE DH Agent 202, for example, based on UE specifications and/or user preferences. Particularly, the DH client 612 can be specific to the UE 604 and can be better adapted to the characteristics of the UE 604. For example, the DH client 612 can utilize native graphics engines to render better graphics on the display screen of UE 604.

Further, the FAP 104 can include a femto DH Agent 208 that can be employed to authenticate the FAP 104 with the DH LAN 310 and/or facilitate location assisted cellular services by sharing obtaining location data. In addition, the femto DH Agent 208 can facilitate wireline and/or wireless convergence by inter-working between the DH functions 610 and mobility applications 616. Further, in one example, a DSL network can be employed, by the FAP 104, as the transport media to connect to the femto gateway (FGW) 618 located at the edge of the mobility core network. The conventional Iu traffic consisting of the Circuit Switched (Iu-cs) voice traffic and Packet Switched (Iu-ps) data traffic together with femto signaling can be transported between the femtocell and FGW 618 in a secure channel. The Iu over IP protocol can be referred to as Iu+. In one example, the FGW 618 can aggregate regional femtocells' traffic and tunnel the traffic to the core network. The conventional circuit switched (CS) traffic can be routed to a Mobile Switching Center (MSC) and the packet switched (PS) traffic can be routed to a Serving GPRS Support Node (SGSN) 620 and Gateway GPRS Support Node (GGSN) 622.

Figure 7:
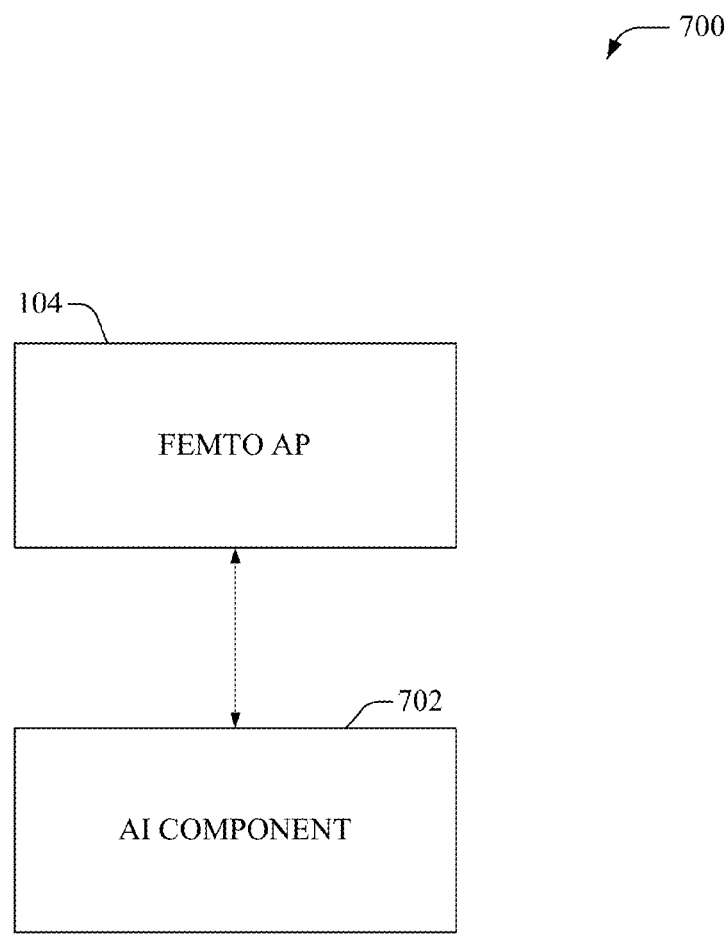
FIG. 7 illustrates an example system that facilitates automating one or more features in accordance with the subject innovation.

FIG. 7 illustrates an example system 700 that employs an artificial intelligence (AI) component 702, which facilitates automating one or more features in accordance with the subject innovation. It can be appreciated that the FAP 104 can include respective functionality, as more fully described herein, for example, with regard to systems 100-600. Further, although illustrated as being externally connected to the FAP 104, it can be appreciated that the AI component 702 can be internal to and reside within the FAP 104.

The subject innovation (e.g., in connection with routing, integration, etc.) can employ various AI-based schemes for carrying out various aspects thereof. For example, a process for optimal route determination by the routing component 108 can be facilitated via an automatic classifier system and process. Moreover, where local breakout can be employed at the FAP 104, the classifier can be employed to determine how and/when the received traffic can be routed. Further, the classifier can identify how and/or which home services can be integrated with a UE attached to the FAP 104.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information within the packet headers or other data-specific attributes derived from the information within the packet headers, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria whether the received traffic can directly be routed to a home network (e.g., DH LAN 310), whether a service on the DH LAN can be integrated with a UE attached to the FAP 104, etc. The criteria can include, but is not limited to, the amount of traffic received, the type of traffic received, the importance (e.g., priority) of the traffic received, historical patterns, UE behavior, user preferences, service provider preferences and/or policies, access privileges, location of UE, date or time, femto AP parameters, etc.

Figure 8:
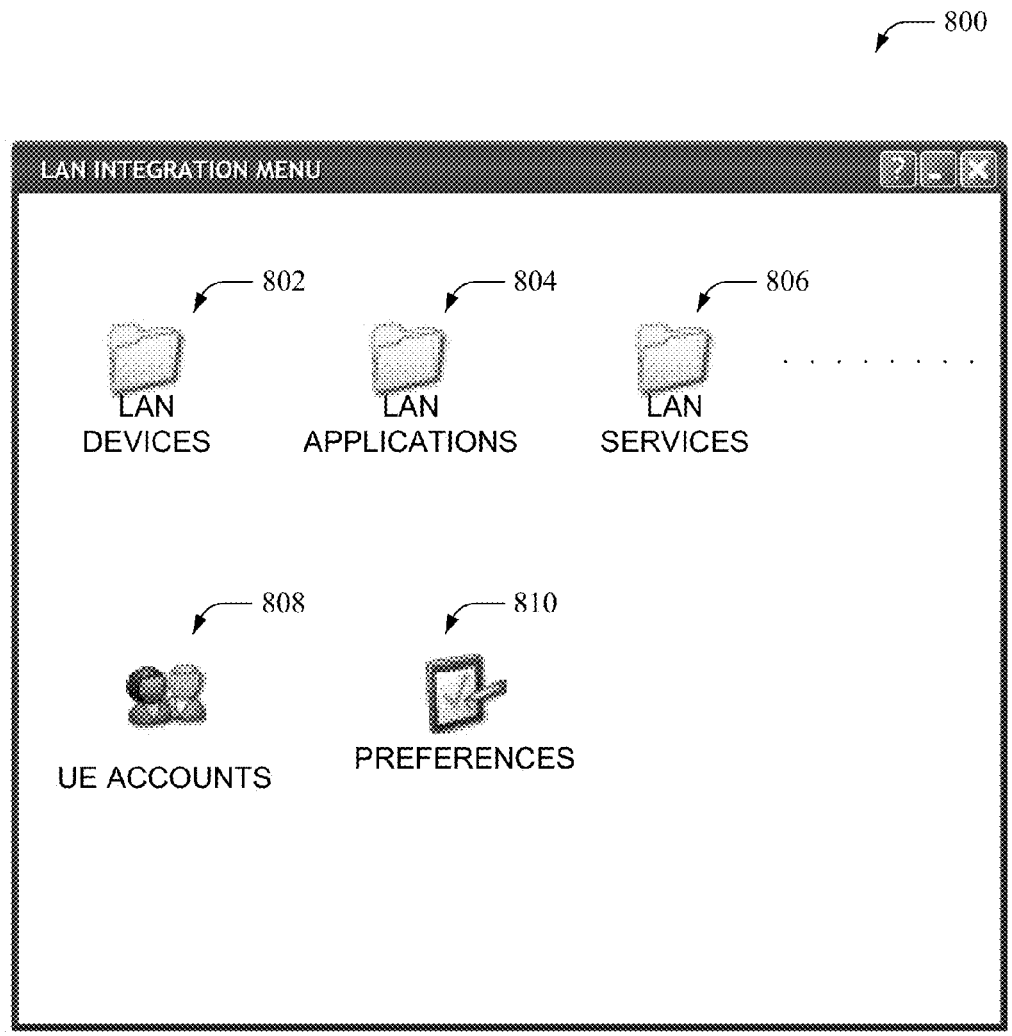
FIG. 8 illustrates an example GUI rendered on a UE, which can display the options available to a user, when the UE is attached to a femto AP.
Figure 9:
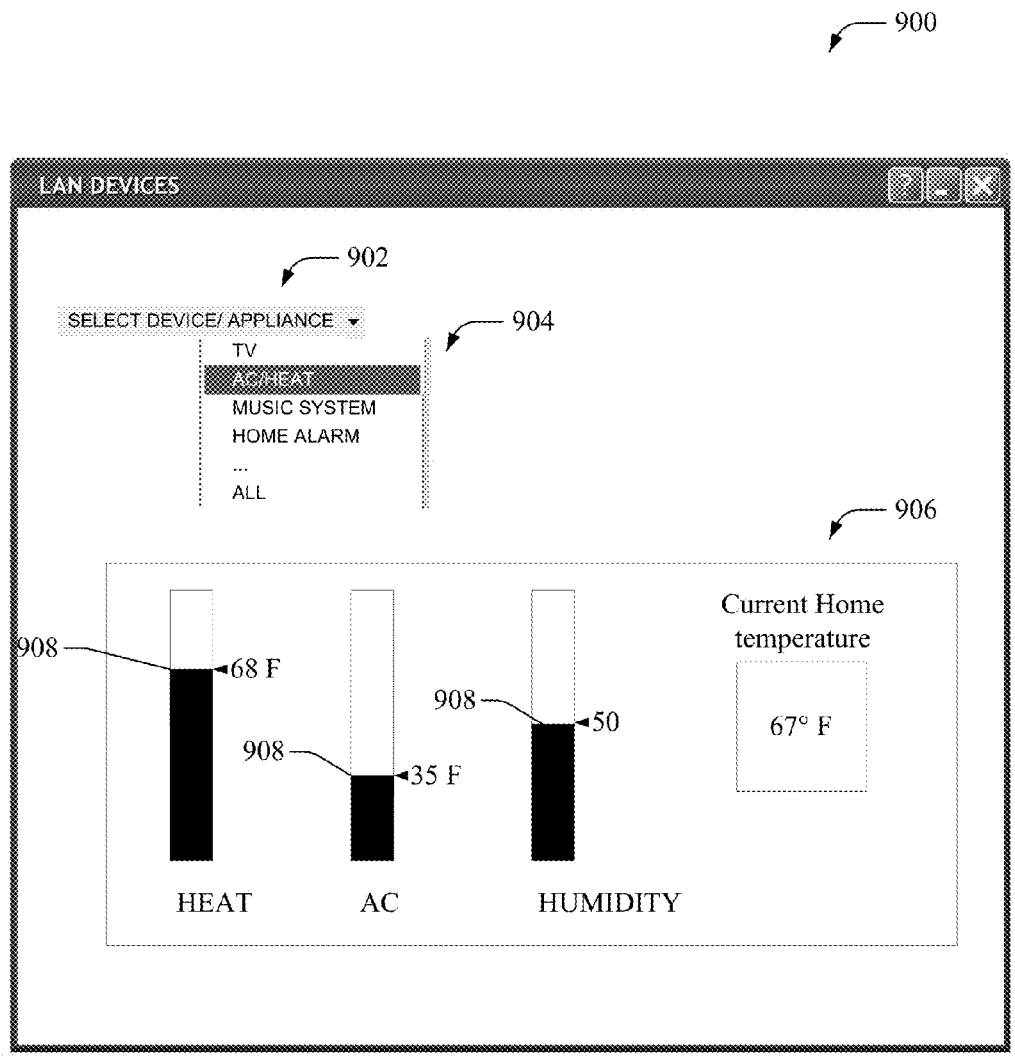
FIG. 9 illustrates an example GUI that can display status of a selected device and/or appliance of the DH LAN on the UE by employing a local breakout mechanism at a femto AP.
Figure 10:
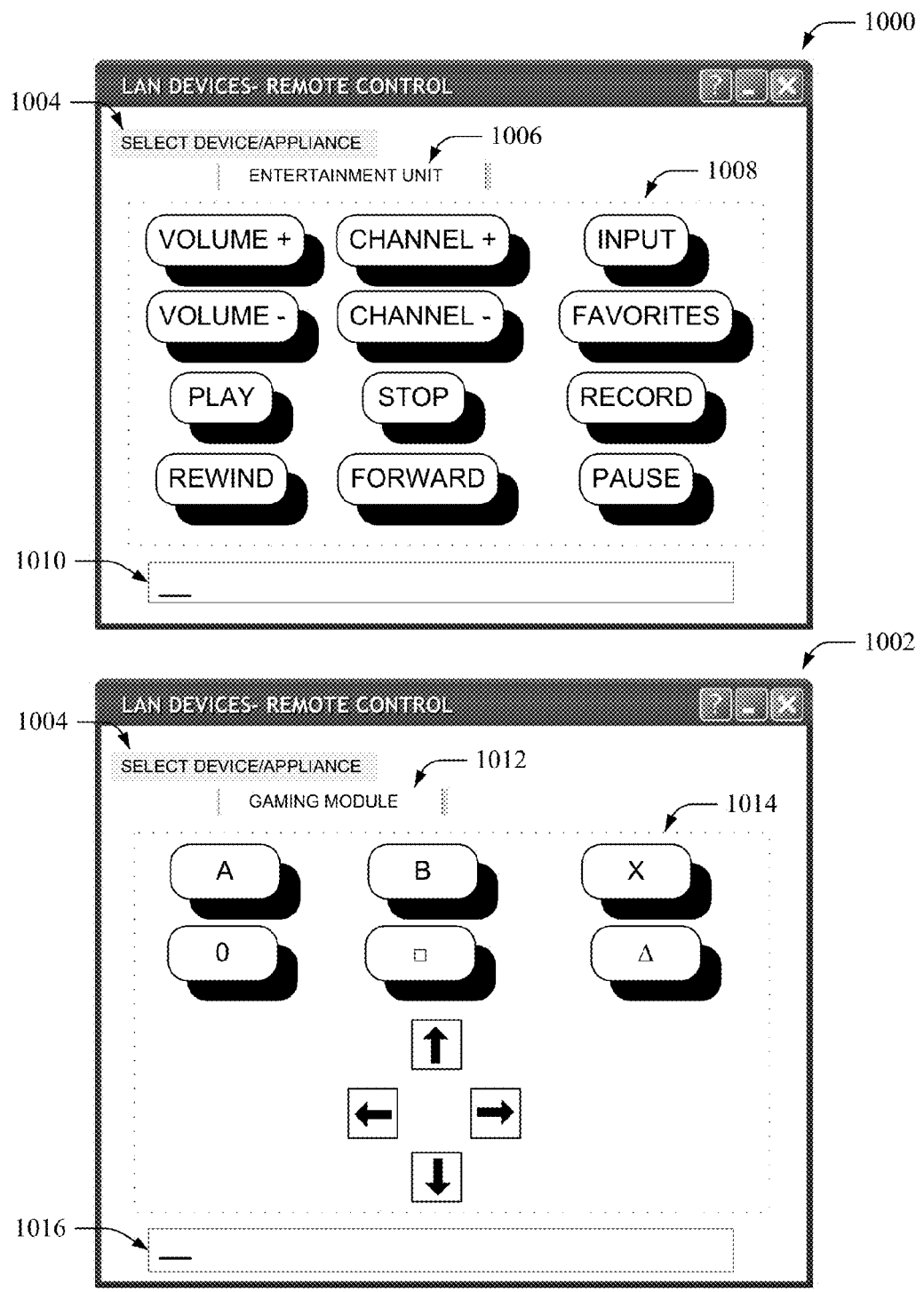
FIG. 10 illustrates example GUIs that can be generated and displayed to a user to enable the user to utilize a UE as a remote control for various devices and/or appliances connected to a DH LAN.

FIGS. 8-10 illustrate exemplary graphical user interfaces that can be displayed on a screen of a UE connected to a femto AP (e.g., FAP 104) to facilitate home services integration. Each figure depicts a graphical user interface (GUI) that includes a plurality of related images and interface objects or elements to facilitate monitoring, control and/or integration of DH LAN services, applications and/or devices. For example, an interface can include any combination of, among other things, text, text boxes, drop down menus, checkboxes, and buttons which can be interacted with utilizing one or more of a pointing device (e.g., stylus, mouse, trackball, touchpad, touch screen . . . ), keyword, or voice activated software. It should be noted, however, that these illustrations are provided by way of example and not limitation. As one of skill in the art can appreciate, there is a plethora of ways to arrange and present objects and text of graphical user interfaces. The depicted GUIs illustrate only one such arrangement and are presented for purposes of clarity and understanding and not to limit the scope of the subject invention to that which is disclosed.

Referring initially to FIG. 8, there illustrated is an example GUI 800 rendered on the UE (e.g., by employing RUI manager 210), which can display the options available to a user, when the UE is attached to a femto AP (e.g., FAP 104). As an example, the GUI 800 can be presented to the user, when the UE is attached to the femto AP that is connected with a DH LAN. Typically, an RUI manager 210 (FIG. 2) can be employed to generate a GUI and the UE DH agent 202 (FIG. 2) and/or UE DH Client 612 can translate the GUI to the GUI 800 on the display of the UE (e.g., monitor, touch screen, LCD display, etc.). Typically, the UE DH agent 202 can generates a web page (e.g., GUI 800) compatible with the device web browser from the GUI provided by the RUI manager 210, and the UE DH client 612 can employ user drawing primitives of a graphic engine to render the GUI (e.g., GUI 800) from the GUI provided by the RUI manager 210. Moreover, based on access privileges of the UE (e.g., managed by the access management component 206) various icons (802-810) can be displayed. It can be appreciated that although only five icons are illustrated, the GUI can have most any number of icons of most any shape or size.

According to an aspect, the user can select (e.g., by clicking) any of the icons (802-810) to receive more information. For example, when the user selects the LAN devices icon 802, a list and/or graphical representation of the devices/appliances on the DH LAN that are available to the user can be provided. In particular, the access management component 206 can provide the list of devices/appliances, which can be access by the UE based in part on access privileges, user and/or network provider policies, femto AP parameters, UE parameters, etc. Similarly, on selecting the LAN applications icon 804, or the LAN services icon 806, the user can be provided with a list (and/or graphical representation) of application or services available to the user. In one aspect, only those options can be displayed that the user is authorized to view or perform. For is example, if the access management component 206 determined that the UE is only allowed to view status of a home appliance, but cannot control or modify the setting of the appliance, only the status of the appliance can be displayed when the appliance is selected. However, if the UE is authorized to view and control the home appliance, the status of the appliance can be displayed along with interactive buttons or representations that can enable the user to control the setting of the appliance.

Further, icon 808 can be employed to enable an authorized user to update and/or edit information associated with UE accounts, such as but not limited to, ACL information and/or access privileges. In one example, only a femto AP owner and/or authorized user with administrative privileges can be allowed to select icon 808 and modify UE account information. Furthermore, icon 810 can be selected by the authorized user to set and/or edit UE preferences, user policies, and/or UE parameters. It can be appreciated that although icons 802-806 are illustrated as folders, most any representation can be employed. In an alternate embodiment, the LAN devices, application and services can be access through tabs.

FIG. 9 illustrates an example GUI 900 that can display status of a selected device and/or appliance of the DH LAN on the UE by employing a local breakout mechanism at a femto AP (e.g., FAP 104). As an example, GUI 900 can be displayed when the user selects the icon 802 in FIG. 8 by employing RUI manager 210 (FIG. 2). According to an aspect, a dropdown menu 902 can be provided, that displays a list of devices and/or appliances 904 that are available to the UE (e.g., determined by the access management component 206). Moreover, the status, settings and/or parameters of a selected device/appliance can be displayed in area 906 by employing a monitoring component 204 (FIG. 2). In one aspect, the user can select one or more devices/appliances, and/or can monitor all devices/appliances at once, by selecting the "all" option in the dropdown menu.

According to an embodiment the RUI manager 210, based on information from the monitoring component 204 and/or by employing a home monitoring client (e.g., client 608) can render GUI 900 on the display of the UE. The GUI 900 can present information associated with devices/applications/services on the DH LAN, and enable the user, if authorized, to control the devices/applications/services on the DH LAN. For example, a user can control a device and/or appliance connected to the DH LAN via the UE when the UE attaches to the femtocell, without transferring communication through the core network. As an example, the user can select a device/appliance from the dropdown list 904 and monitor the status of the selected device/appliance in area 906. In one aspect, the user can monitor from the UE, appliances that are ON and appliances that are OFF. As an example, the user, if authorized, can modify the settings of appliances from the UE, by interacting with GUI 900. For example, the user can employ GUI 900 to turn ON or OFF lights, change thermostat settings to vary the home temperature, enable or disable a home alarm, turn on a music system, close a garage door, etc. Moreover, the RUI manager 210 can be employed to facilitate interworking between various home device interfaces and the interface displayed on the UE. According to an aspect, the user can provide an input, for example, by clicking or typing, to change settings of a selected device and the RUI manager 210 can interpret the user entries and/or commands and send the respective information/commands to the device.

The example GUI 900 displays an AC/HEAT option selected by the user from the dropdown list 904. Accordingly, display area 906 can present the user with information associated with a heating/cooling system connected to the DH LAN. In this example, the current home temperature can be displayed along with the temperature control settings. Additionally, if the user is authorized to change the settings, the user can move the levels 908 to the preferred level to adjust the temperature. It can be appreciated that the GUI 900 can provide most any mechanism for the user to change setting and/or control devices, for example by entering a command, dragging a level pointer, clicking a button, etc. Accordingly, the user can control the heating/cooling system remotely from the UE, when the UE attaches to the femto AP and communications can be directly routed between the UE and the heating/cooling system, without employing core network resources.

Referring now to FIG. 10, there illustrated are example GUIs 1000 and 1002 that can be generated and displayed to a user to enable the user to utilize a UE as a remote control for various devices and/or appliances connected to a DH LAN, according to an aspect of the subject innovation. In one embodiment, the RUI manager 210 can display GUIs 1000 and 1002 on a screen of the UE attached to a femto AP (e.g., FAP 104), if determined the UE is authorized to control devices/appliances. The femto AP can be connected to the DH LAN and can employ a remote control client (e.g., client 608) to facilitate control of one or more devices/appliances on the DH LAN via the UE, by communication of data directly between the UE and the devices/appliances, without transferring data via the core network.

GUI 1000 can include a drop down menu 1004 that enables a user to select a device and/or appliance to control from the authorized UE. It can be appreciated that most any representation can be employed to enable selection. In one example, a user can select an entertainment unit 1006 from a dropdown list and the GUI 1000 can display a set of controls in display area 1008. In the case of the entertainment unit, the controls can include, but are not limited to, volume controls, channel controls, favorites, input, play, stop, record, rewind, forward, pause, or most any other controls available to modify setting of the entertainment unit. In one example, along with displaying the controls, a current status of the controls can also be displayed (not shown), for example, volume=19, channel=4, etc. Typically, the controls displayed in area 1008 can be interactive buttons, which can be selected by the user to perform an action (e.g., increase/decrease volume). Additionally or alternately, the user can enter a command at the prompt 1010 to control one or more features of the selected device and/or appliance, and/or perform an action. Accordingly, the user can utilize the UE as a remote control for the entertainment unit and communication traffic can be transferred directly between the UE and the entertainment unit application via the femto AP.

Similarly, GUI 1002 can utilize most any representation, such as, but not limited to a drop down menu 1004 that facilitates device and/or appliance selection from an authorized UE. As an example, a user can select a gaming module 1012 from a dropdown list and the GUI 1002 can display a set of controls associated with the gaming module in display area 1014. In this example, the controls can include, but are not limited to, gaming module specific keys (e.g., A, B, X, 0, □, Δ, etc.), arrow keys, etc. that can be employed to play a game. Moreover, the controls displayed in area 1014 can include interactive buttons, which can be selected by the user to perform an action (e.g., move left, move right, etc.). Furthermore, the GUI 1002 can provide the user with a command prompt 1016 wherein the user can enter most any command, for example, via a keypad, to perform one or more actions associated with the gaming module. Accordingly, the user can utilize the UE as a remote control for the gaming module, such that, information can be transferred directly between the UE and the gaming application via the femto AP.

FIGS. 11-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
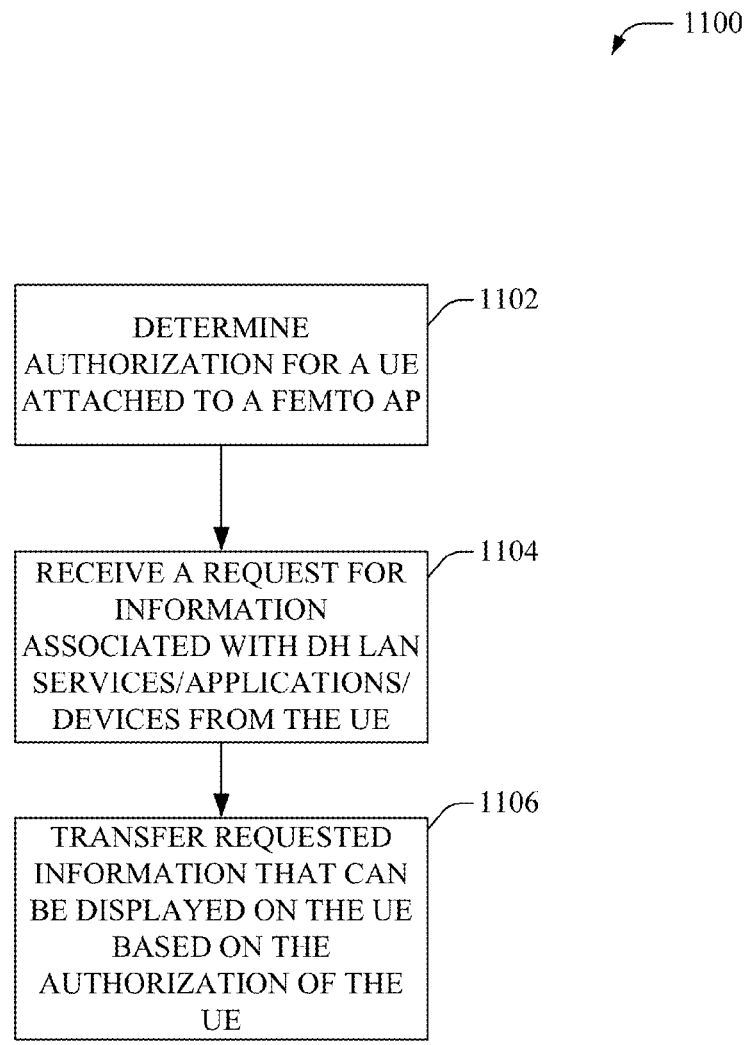
FIG. 11 illustrates an example methodology can be employed to facilitate home services integration by employing a local breakout mechanism at a femtocell.

Referring now to FIG. 11, illustrated is an example methodology 1100 that can be employed to facilitate home services integration by employing a local breakout mechanism at a femtocell, according to an aspect of the subject disclosure. In particular, a femto AP can facilitate local breakout and directly route information between a DH LAN, connected to the femto AP, and a UE, attached to the femto AP. According to an aspect, at 1102, authorization for a UE attached to a femto AP can be determined. For example, information, such as, but not limited to access privileges, user preferences, service provider policies, UE parameters, ACLs, etc. can be employed to determine the authorization for the UE.

At 1104, a request for information associated with DH LAN services, applications, and/or devices can be received from the UE. Moreover, if the user is authorized to access the DH LAN services, applications, and/or devices, the requested data can be obtained, for example, directly from the DH LAN, without directing the requested data through a macro network. Further, at 1106, the requested information can be transferred to the UE, which can be displayed on the UE, based on the authorization of the UE. Typically, an application-specific and/or UE-specific (e.g., by employing UE DH client 612) UI can be rendered on a display of the UE. As an example, a user can view and/or interact with the displayed UI based on the UE authorization. In one example, the UE authorization can indicate that the user can only view information and in another example, the UE authorization can indicate that the user can be permitted to view and communicate with and/or control the devices on the DH LAN. For example, a webpage can be rendered on the UE display that can include requested information and/or interactive buttons, which enable the user to monitor and/or control services/applications/devices on the DH LAN.

Figure 12:
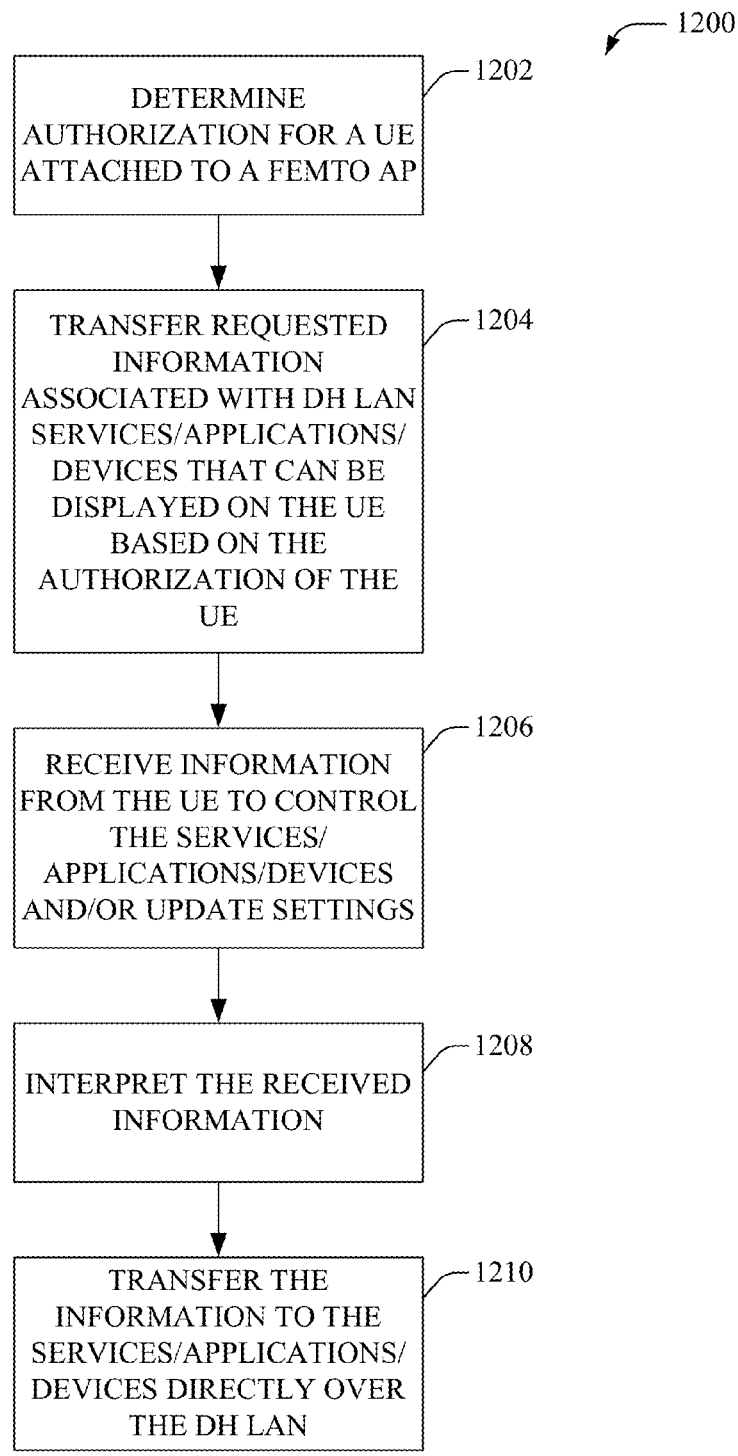
FIG. 12 illustrates an example methodology that facilitates controlling devices on a DH LAN, via a UE attached to a femto AP, by employing local breakout at the femto AP.

FIG. 12 illustrates an example methodology 1200 that facilitates controlling devices on a DH LAN, via a UE attached to a femto AP, by employing local breakout at the femto AP. As an example, when a femto AP is deployed in a home, an authorized UE can be utilized to turn lights on and off, change thermostat settings to vary the home temperature, close a garage door, etc. At 1202, authorization for a UE attached to the femto AP can be determined. Further, at 1204, information associated with DH LAN services, applications, and/or devices, requested by the UE can be transferred from the DH LAN to the UE, for example, by performing a local breakout at the femto AP. In an aspect, the requested information can be displayed on the UE based in part on the authorization of the UE. Moreover, various web pages representing the UIs of the different devices on the DH LAN (e.g., in the home) can be provided to the UE as requested. The user can view the web pages on the UE and interact with them to monitor and/or control devices on the DH LAN.

As an example, requested information can be displayed on the UE by employing most any UI, such as, but not limited to, a remote control interface for a device/appliance on the DH LAN (e.g., television, DVD player, music system, media player, gaming device, etc.). Accordingly, a user can utilize the UE as a remote control to modify settings of the device/appliance. For example, the user can employ the UI on the UE to change the volume of the music system and/or remotely open or close a garage door, etc. In one aspect, at 1206 information for controlling the services, applications and/or devices, and/or updating settings can be received from the UE. At 1208, the received information, including but not limited to, user entries and/or commands, can be interpreted. Further, the interpreted information can be transferred to the respective services, applications and/or devices directly over the DH LAN, without hairpinning through the core network.

Figure 13:
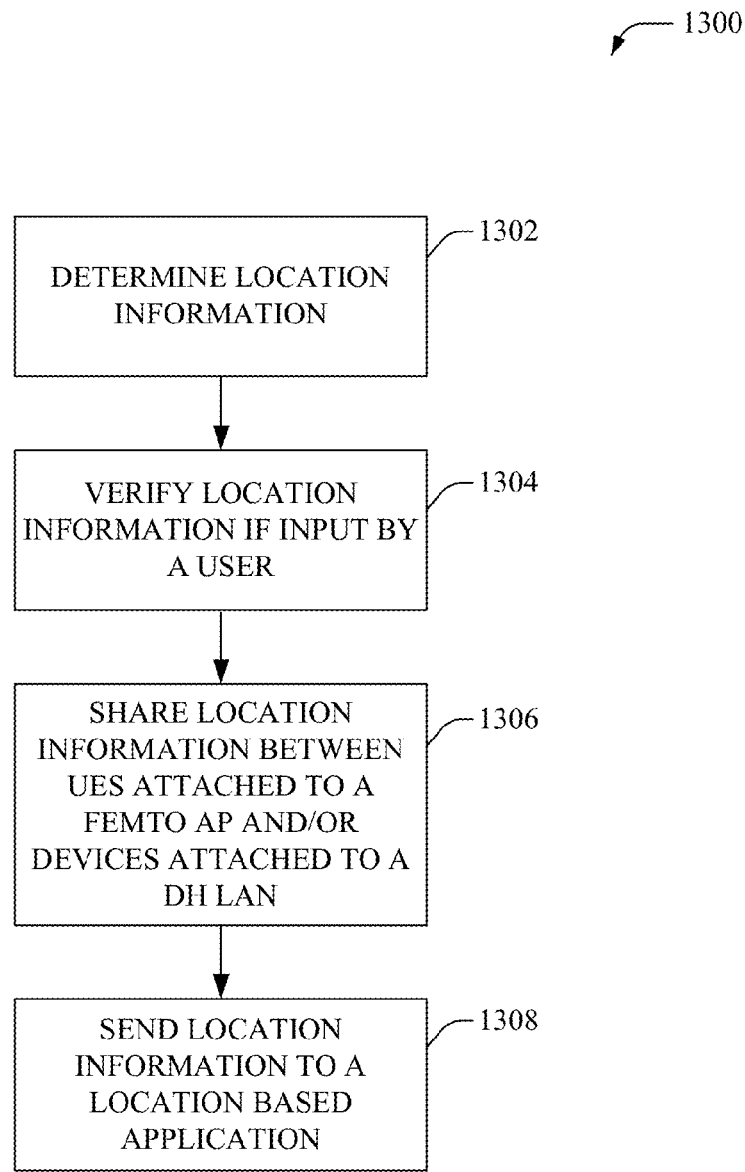
FIG. 13 illustrates an example methodology that facilitates sharing of location information in accordance with an aspect of the subject specification.

FIG. 13 illustrates an example methodology 1300 that facilitates sharing of location information in accordance with an aspect of the subject specification. At 1302, location information can be determined. For example, location information can include, but is not limited to geographical coordinates, a postal or physical address, etc. In one aspect, the location information can be obtained from various sources, such, but not limited to, location of the femto AP provided during deployment, location information from a server, device, application and/or service on the DH LAN, location information provided by a UE attached to the femto AP, location information input by a user. At 1304, location data provided by a user can be verified.

In one aspect, at 1306, location information can be shared between UEs attached to the femto AP and/or devices attached to the DH LAN. It can be appreciated that the communication of location information can be performed directly, without employing core network resources. In one example, when the UE attached to the femto AP does not include a Global Positioning System (GPS), or if the GPS functionality within the UE cannot obtain GPS co-ordinates, for example, when the UE is within in a building, the UE can utilize the shared location information. In another example, location information, for example, GPS information, can be obtained from the UE attached to the femto AP and can be utilized to identify location of a disparate UE connected to the femto AP, a server, device, application and/or service on the DH LAN. Moreover, at 1308, the shared location information can be provided to most any location-based services, including, but not limited to emergency services (e.g., E911). As an example, the shared location information can be provided it to a mobility location server.

Figure 14:
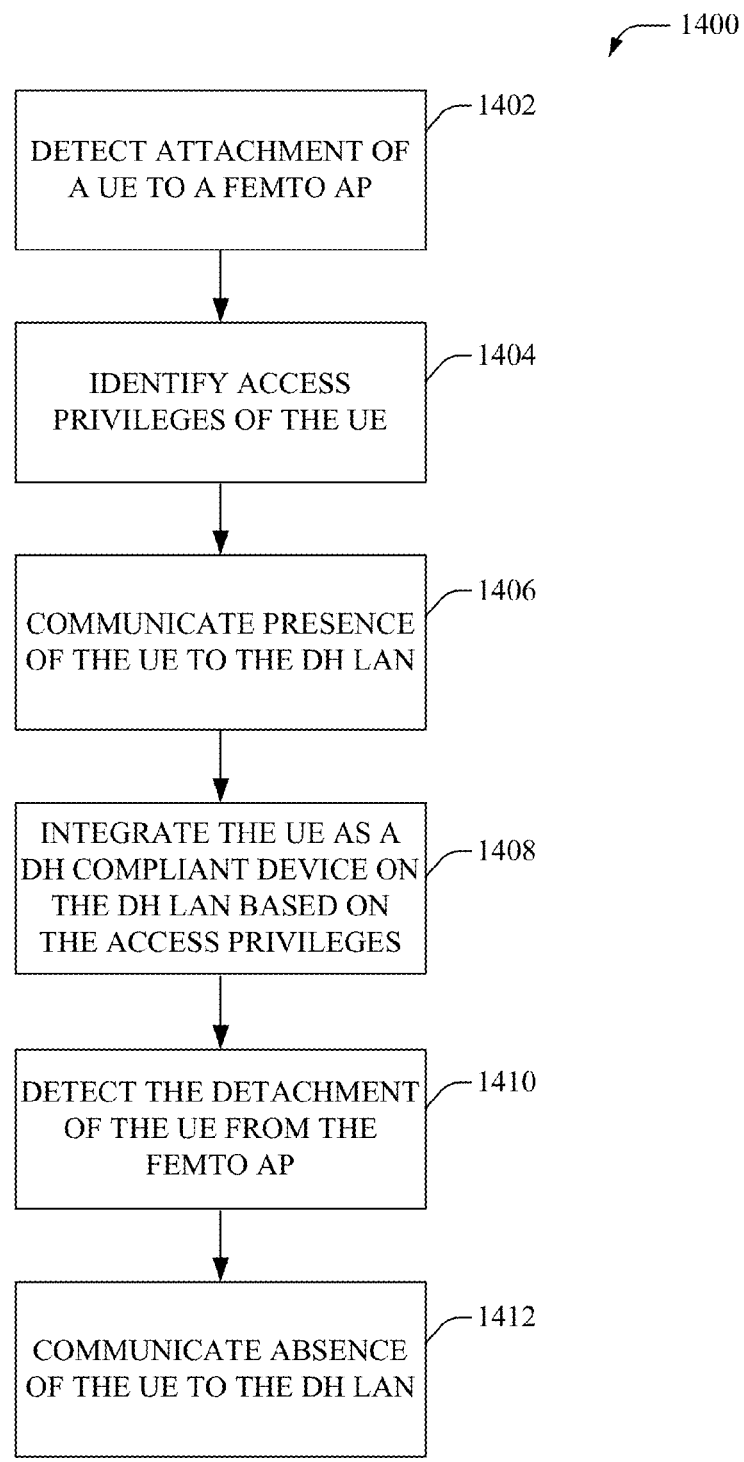
FIG. 14 illustrates an example methodology that facilitates interworking between various home device interfaces and a UE attached to a femto AP.

Referring to FIG. 14, there illustrated is an example methodology 1400 that facilitates interworking between various home device interfaces and the UE attached to a femto AP, according to an aspect of the subject disclosure. At 1402, attachment of a UE to a femto AP can be detected. At 1404, access privileges of the UE can be determined. In one aspect, the access privileges can determine whether a UE can be allowed to directly access a DH LAN connected to the femto AP, and/or which devices, applications and/or services of the DH LAN can the UE monitor and/or control.

At 1406, the presence of the UE can be communicated to the devices, applications and/or services of the DH LAN, based on the authorization of the UE. At 1408, the UE can be integrated as a DH compliant device on the DH LAN, based on the identified access privileges. For example, private branch exchange (PBX) integration, home intercom integration, home control and automation integration, can be facilitated and the UE can act as a handset for the PBX system, the intercom system, and/or a remote control for the home control and automation system. In addition, at 1410, the detachment of the UE from the femto AP can be detected. In one aspect, session continuity for traffic between the UE and select DH LAN applications, services and/or devices can be maintained when the UE moves from the femtocell to a macro cell and/or a disparate femtocell. At 1412, absence of the UE can be communicated to the applications, services and/or devices of the DH LAN.

Figure 15:
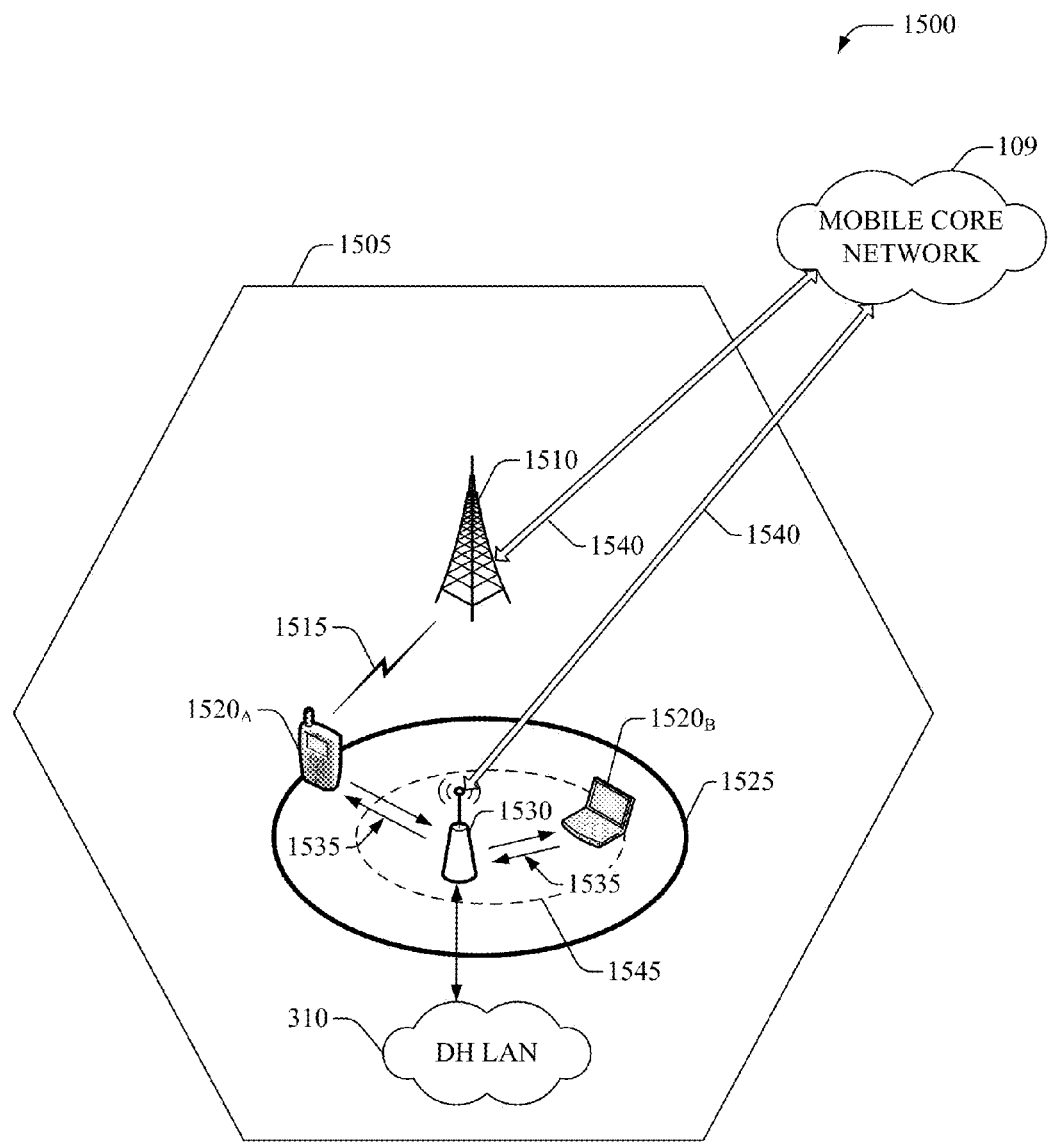
FIG. 15 illustrates an example wireless communication environment with associated components for operation of a femtocell in accordance with the subject specification.

FIG. 15 illustrates a schematic wireless environment 1500 (e.g., a network) in which a femtocell can exploit various aspects of the subject innovation in accordance with the disclosed subject matter. In wireless environment 1500, area 1505 can represent a coverage macro cell, which can be served by base station 1510. Macro coverage is generally intended for outdoors locations for servicing mobile wireless devices, like UE 1520$_A$, and such coverage is achieved via a wireless link 1515. In an aspect, UE 1520 can be a 3GPP Universal Mobile Telecommunication System (UMTS) mobile phone.

Within macro coverage cell 1505, a femtocell 1545, served by a femto access point 1530, can be deployed. A femtocell typically can cover an area 1525 that is determined, at least in part, by transmission power allocated to femto AP 1530, path loss, shadowing, and so forth. Coverage area typically can be spanned by a coverage radius that ranges from 20 to 50 meters. Confined coverage area 1545 is generally associated with an indoors area, or a building, which can span about 5000 sq. ft. Generally, femto AP 1530 typically can service a number (e.g., a few or more) wireless devices (e.g., subscriber station 1520$_B$) within confined coverage area 1545. In an aspect, femto AP 1530 can integrate seamlessly with substantially any PS-based and CS-based network; for instance, femto AP 1530 can integrate into an existing 3GPP Core via conventional interfaces like Iu-CS, Iu-PS, Gi, Gn. In another aspect, femto AP 1530 can exploit high-speed downlink packet access in order to accomplish substantive bitrates. In yet another aspect, femto AP 1530 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 1520$_A$, leaves macro coverage (e.g., cell 1505) and enters femto coverage (e.g., area 1515), as illustrated in environment 1500, UE 1520$_A$ can attempt to attach to the femto AP 1530 through transmission and reception of attachment signaling, effected via a FL/RL 1535; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1520 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 1530) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1520 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1520 can be allowed on femtocell 1525 and incoming voice and data traffic can be paged and routed to the subscriber station through the femto AP 1530. It is to be noted also that data traffic is typically routed through a backhaul broadband wired network backbone 1540 (e.g., optical fiber backbone, twisted-pair line, T1/E1 phone line, DSL, or coaxial cable). It is to be noted that as a femto AP 1530 generally can rely on a backhaul network backbone 1540 for routing, signaling and paging. Namely, packet flows established for wireless communication devices (e.g., terminals 1520$_A$ and 1520$_B$) served by femto AP 1530, and for devices served through the backhaul network pipe 1540. It is to be noted that to ensure a positive subscriber experience, or perception, it is desirable for femto AP 1530 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1525 or area 1545).

It can be appreciated that the femto AP 1530 can be substantially similar to FAP 104 and include functionality, more fully described herein, for example, with respect to systems 100-700. In particular, femto AP 1530 can include a routing component 108 that can utilize one or more local breakout mechanisms to facilitate efficient routing of traffic, for example, between UE (1520$_A$ and 1520$_B$), DH LAN 310, and/or base station 1510 via backhaul broadband wired network backbone 1540. Further, the femto AP 1530 can include integration component 112, monitoring component 204, RUI manager 210 and/or access management component 206, described in detail with respect to system 200.

Figure 16:
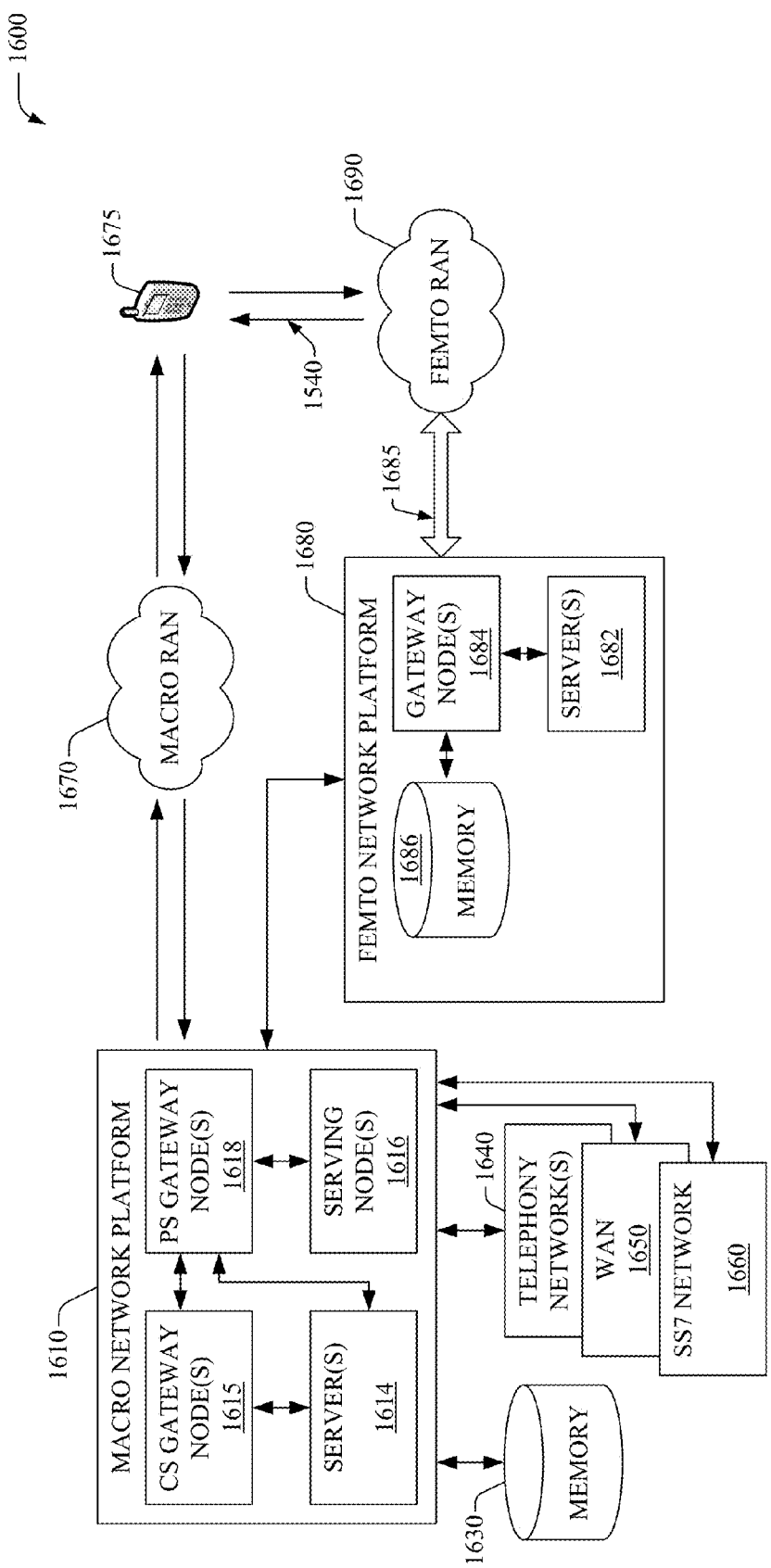
FIG. 16 illustrates a schematic deployment of a macro cell and a femtocell for wireless coverage in accordance with aspects of the disclosure.
Figure 17:
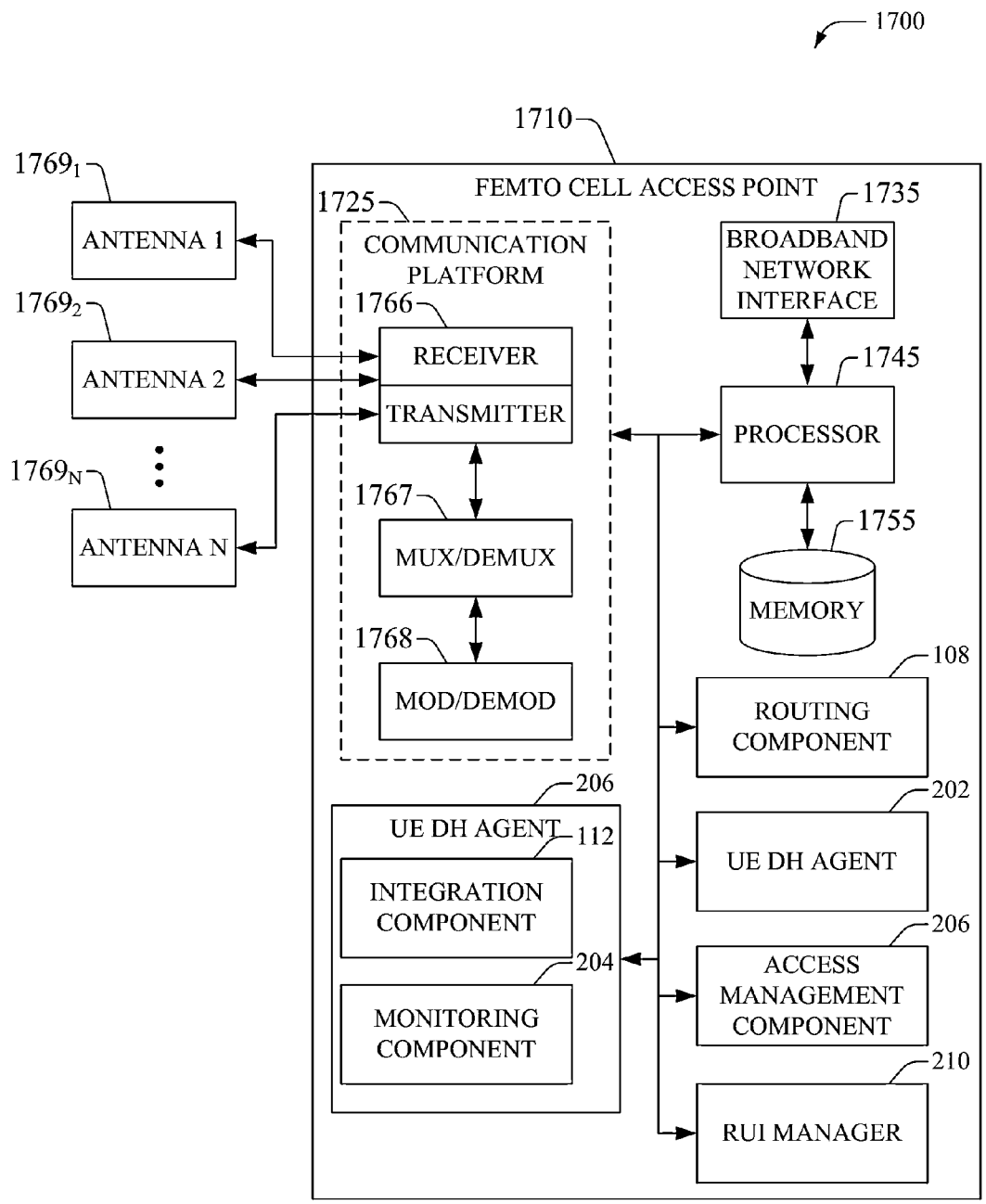
FIG. 17 illustrates an example embodiment of a femto access point that can facilitate UE and DH LAN interworking by employing local breakout, according to the subject disclosure.

To provide further context for various aspects of the subject specification, FIGS. 16 and 17 illustrate, respectively, an example wireless communication environment 1600, with associated components for operation of a femtocell, and a block diagram of an example embodiment 1700 of a femto access point, which can facilitate local breakout at a femtocell to provide home services integration and management in accordance with aspects described herein.

Wireless communication environment 1600 includes two wireless network platforms: (i) A macro network platform 1610 that serves, or facilitates communication) with user equipment 1675 via a macro radio access network (RAN) 1670. It should be appreciated that in cellular wireless technologies (e.g., 3GPP UMTS, HSPA, 3GPP LTE, 3GPP UMB), macro network platform 1610 is embodied in a Core Network. (ii) A femto network platform 1680, which can provide communication with UE 1675 through a femto RAN 1690 linked to the femto network platform 1680 via backhaul pipe(s) 1685, wherein backhaul pipe(s) are substantially the same a backhaul link 1540. It should be appreciated that femto network platform 1680 typically offloads UE 1675 from macro network, once UE 1675 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1670 can comprise various coverage cells like cell 1505, while femto RAN 1690 can comprise multiple femtocell access points. As mentioned above, it is to be appreciated that deployment density in femto RAN 1690 is substantially higher than in macro RAN 1670.

Generally, both macro and femto network platforms 1610 and 1680 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1610 includes CS gateway node(s) 1612 which can interface CS traffic received from legacy networks like telephony network(s) 1640 (e.g., public switched telephone network (PSTN), or public land mobile network (PLMN)) or a SS7 network 1660. Moreover, CS gateway node(s) 1612 interfaces CS-based traffic and signaling and gateway node(s) 1618.

In addition to receiving and processing CS-switched traffic and signaling, gateway node(s) 1618 can authorize and authenticate PS-based data sessions with served (e.g., through macro RAN) wireless devices. Data sessions can include traffic exchange with networks external to the macro network platform 1610, like wide area network(s) (WANs) 1650; it should be appreciated that local area network(s) (LANs) can also be interfaced with macro network platform 1610 through gateway node(s) 1618. Gateway node(s) 1618 generates packet data contexts when a data session is established. It should be further appreciated that the packetized communication can include multiple flows that can be generated through server(s) 1614. Macro network platform 1610 also includes serving node(s) 1616 that convey the various packetized flows of information, or data streams, received through gateway node(s) 1618. It is to be noted that server(s) 1614 can include one or more processor configured to confer at least in part the functionality of macro network platform 1610. To that end, the one or more processor can execute code instructions stored in memory 1630, for example.

In example wireless environment 1600, memory 1630 stores information related to operation of macro network platform 1610. Information can include business data associated with subscribers; market plans and strategies, e.g., promotional campaigns, business partnerships; operational data for mobile devices served through macro network platform; service and privacy policies; end-user service logs for law enforcement; and so forth. Memory 1630 can also store information from at least one of telephony network(s) 1640, WAN(s) 1650, or SS7 network 1660.

Femto gateway node(s) 1684 have substantially the same functionality as PS gateway node(s) 1618. Additionally, femto gateway node(s) 1684 can also include substantially all functionality of serving node(s) 1616. In an aspect, femto gateway node(s) 1684 facilitates handover resolution, e.g., assessment and execution. Server(s) 1682 have substantially the same functionality as described in connection with server(s) 1614 and can include one or more processor configured to confer at least in part the functionality of macro network platform 1610. To that end, the one or more processor can execute code instructions stored in memory 1686, for example.

Memory 1686 can include information relevant to operation of the various components of femto network platform 1680. For example operational information that can be stored in memory 1686 can comprise, but is not limited to, subscriber information; contracted services; maintenance and service records; femtocell configuration (e.g., devices served through femto RAN 1690; access control lists, or white lists; access privileges); service policies and specifications; privacy policies; add-on features; and so forth With respect to FIG. 17, in example embodiment 1700, femtocell AP 1710 can receive and transmit signal(s) (e.g., traffic and control signals) from and to wireless devices, access terminals, wireless ports and routers, etc., through a set of antennas 1769$_1$-1769$_N$. It should be appreciated that while antennas 1769$_1$-1769$_N$ are a part of communication platform 1725, which comprises electronic components and associated circuitry that provides for processing and manipulating of received signal(s) (e.g., a packet flow) and signal(s) (e.g., a broadcast control channel) to be transmitted. In an aspect, communication platform 1725 includes a transmitter/receiver (e.g., a transceiver) 1766 that can convert signal(s) from analog format to digital format upon reception, and from digital format to analog format upon transmission. In addition, receiver/transmitter 1766 can divide a single data stream into multiple, parallel data streams, or perform the reciprocal operation. Coupled to transceiver 1766 is a multiplexer/demultiplexer 1767 that facilitates manipulation of signal in time and frequency space. Electronic component 1767 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1767 can scramble and spread information (e.g., codes) according to substantially any code known in the art; e.g., Hadamard-Walsh codes, Baker codes, Kasami codes, polyphase codes, and so on. A modulator/demodulator 1768 is also a part of operational group 1725, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1710 also includes a processor 1745 configured to confer functionality, at least partially, to substantially any electronic component in the femto access point 1710, in accordance with aspects of the subject innovation. In particular, processor 1745 can facilitate femto AP 1710 to implement configuration instructions received through communication platform 1725, which can include storing data in memory 1755. In addition, processor 1745 facilitates femto AP 1710 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1745 can manipulate antennas $1769_1$-$1769_N$ to facilitate beamforming or selective radiation pattern formation, which can benefit specific locations (e.g., basement, home office . . . ), covered by femto AP; and exploit substantially any other advantages associated with smart-antenna technology. Memory 1755 can store data structures, code instructions, system or device information like device identification codes (e.g., IMEI, IMSI, MSISDN, serial number . . . ) and specification such as multimode capabilities; code sequences for scrambling; and so on. Moreover, memory 1755 can store configuration information such as schedules and policies; femto AP address(es) or geographical indicator(s); access lists (e.g., white lists); access privilege(s); license(s) for utilization of add-features for femto AP 1710, and so forth.

In embodiment 1700, processor 1745 is coupled to the memory 1755 in order to store and retrieve information necessary to operate and/or confer functionality to communication platform 1725, broadband network interface 1735 (e.g., a broadband modem), and other operational components (e.g., multimode chipset(s), power supply sources . . . ; not shown) that support femto access point 1710. The femto AP 1710 can further include a routing component 108, integration component 112, monitoring component 204, access management component 206, RUI manager 210, UE DH agent 202, and femto DH agent 208, which can include functionality, as more fully described herein, for example, with regard to systems 100-700. In addition, it is to be noted that the various aspects disclosed in the subject specification can also be implemented through (i) program modules stored in a computer-readable storage medium or memory (e.g., memory 1686 or memory 1755) and executed by a processor (e.g., processor 1745), or (ii) other combination(s) of hardware and software, or hardware and firmware.

Figure 18:
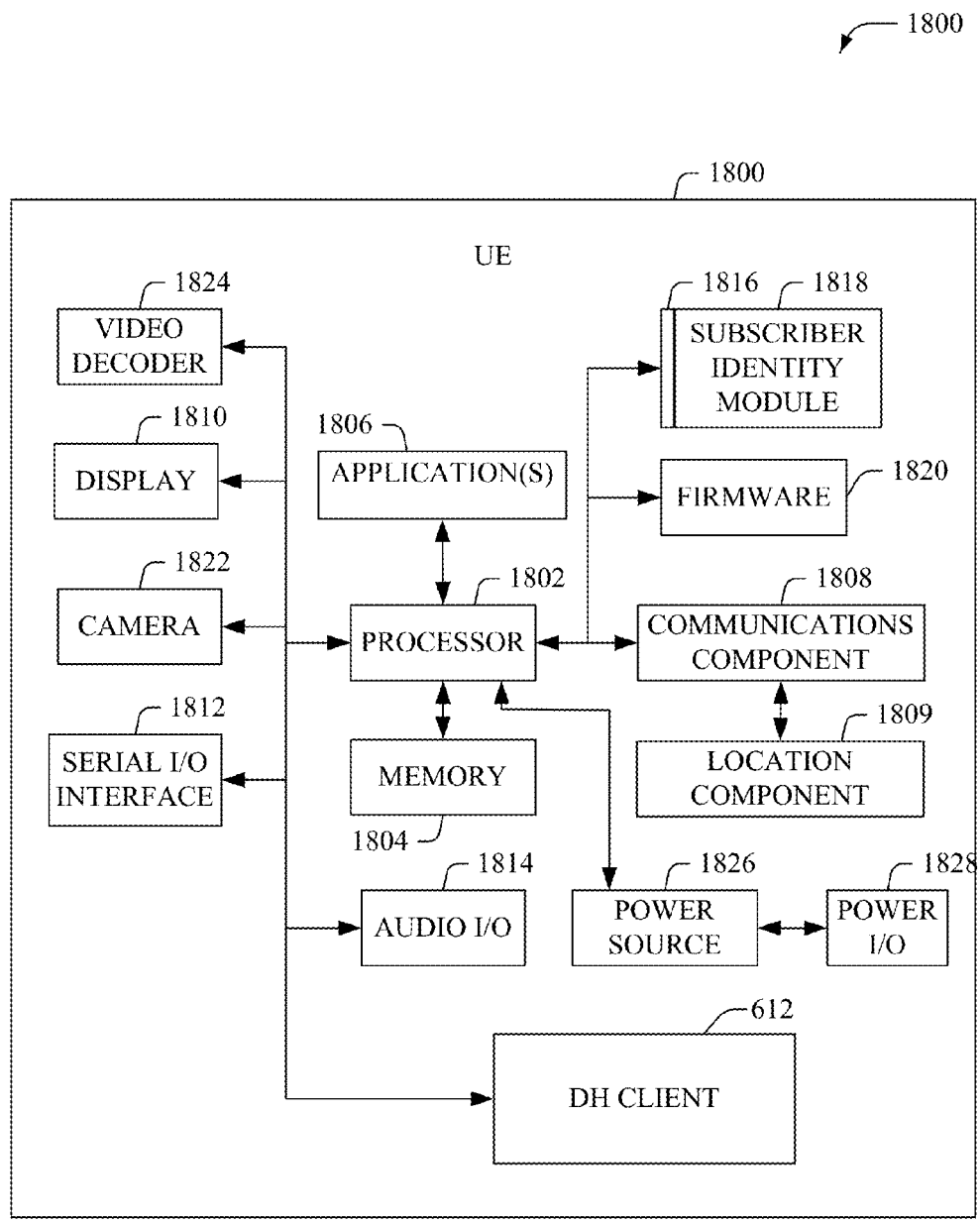
FIG. 18 illustrates a block diagram of a UE suitable for communication with a DH LAN via a femto network in accordance with the innovation.

Referring now to FIG. 18, there is illustrated a block diagram of a UE 1800 suitable for communication with a DH LAN via a femto network in accordance with the innovation. The UE 1800 can include a processor 1802 for controlling all onboard operations and processes. A memory 1804 can interface to the processor 1802 for storage of data and one or more applications 1806 being executed by the processor 1802. A communications component 1808 can interface to the processor 1802 to facilitate wired/wireless communication with external systems (e.g., femtocell and macro cell). The communications component 1808 interfaces to a location component 1809 (e.g., GPS transceiver) that can facilitate location detection of the UE 1800. Note that the location component 1809 can also be included as part of the communications component 1808.

The UE 1800 can include a display 1810 for displaying content downloaded and/or for displaying text information related to operating and using the device features. In one aspect, display 1810 can be employed to display GUIs generated and rendered by RUI manager 210 (FIG. 2). A serial I/O interface 1812 is provided in communication with the processor 1802 to facilitate serial communication (e.g., USB, and/or IEEE 1394) via a hardwire connection. Audio capabilities are provided with an audio I/O component 1814, which can include a speaker for the output of audio signals related to, for example, recorded data or telephony voice data, and a microphone for inputting voice signals for recording and/or telephone conversations.

The device 1800 can include a slot interface 1816 for accommodating a subscriber identity module (SIM) 1818. Firmware 1820 is also provided to store and provide to the processor 1802 startup and operational data. The UE 1800 can also include an image capture component 1822 such as a camera and/or a video decoder 1824 for decoding encoded multimedia content. The UE 1800 can also include a power source 1826 in the form of batteries, which power source 1826 interfaces to an external power system or charging equipment via a power I/O component 1828. In addition, the UE 1800 can include a DH client 612 that facilitates communication between UE 1800 and home network via a femto AP. The DH client 612 can include functionality, as more fully described herein, for example, with regard to system 600.

Figure 19:
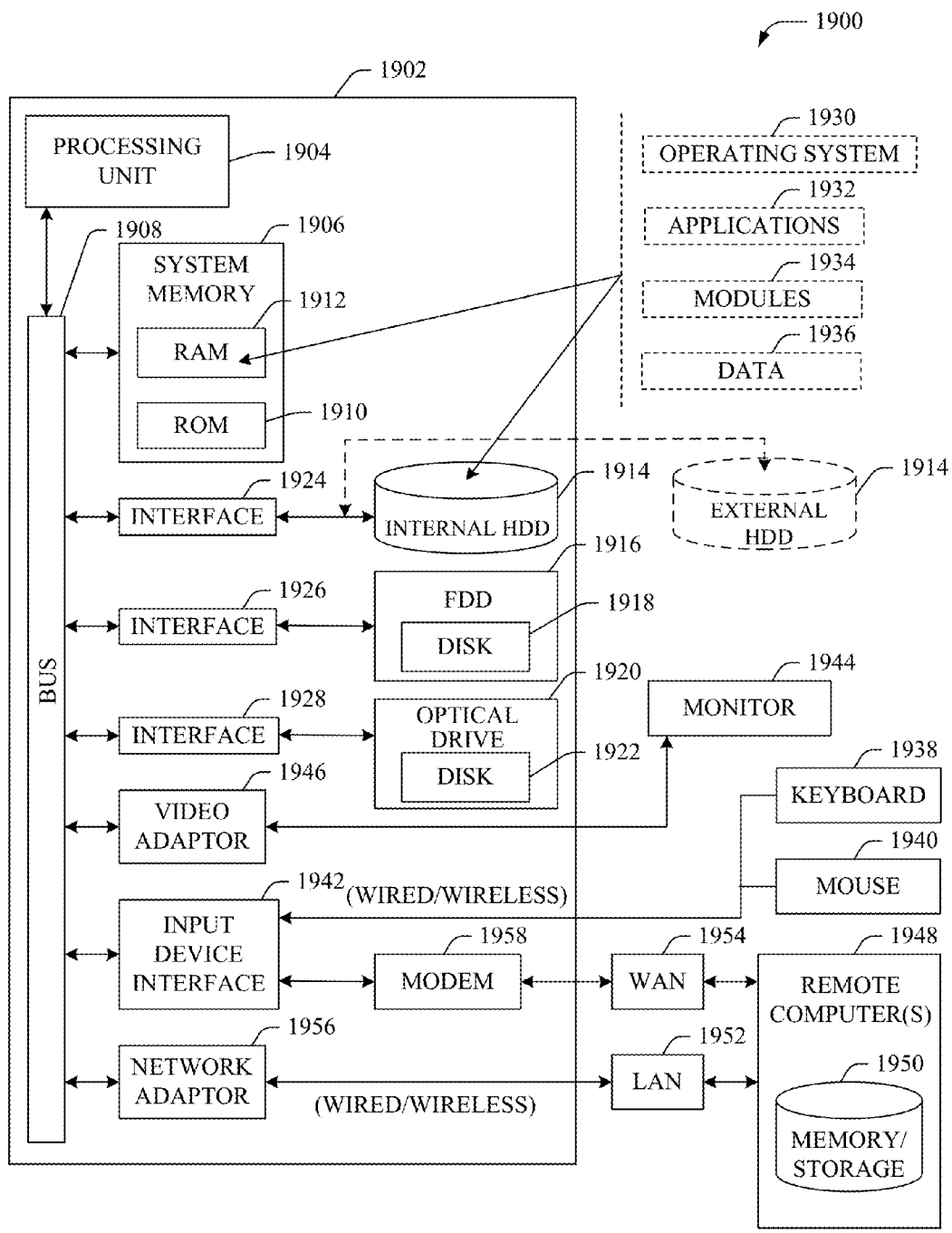
FIG. 19 illustrates a block diagram of a computer operable to execute the disclosed communication architecture.

Referring now to FIG. 19, there is illustrated a block diagram of a computer operable to execute the disclosed communication architecture. In order to provide additional context for various aspects of the subject specification, FIG. 19 and the following discussion are intended to provide a brief, general description of a suitable computing environment 1900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 19, the example environment 1900 for implementing various aspects of the specification includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 can also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the specification can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) can include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 is connected to the local network 1952 through a wired and/or wireless communication network interface or adapter 1956. The adapter 1956 can facilitate wired or wireless communication to the LAN 1952, which can also include a wireless access point disposed thereon for communicating with the wireless adapter 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are example and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual bands), so the networks can provide real-world performance similar to the wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store instructions; and
    a processor, coupled to the memory, that facilitates execution of the instructions to perform operations, comprising:
        receiving, from a first user equipment coupled to a femto access point device,
    a call directed to a second user equipment;
        based on location data determined to be indicative of a location of the first user equipment being within a coverage area of the femto access point device, modifying access privilege data assigned to the first user equipment, wherein the access privilege data represents an authorization of the user equipment to access, from the location, a set of devices of a local area network that is coupled to the femto access point device;
        in response to determining that the access privilege data satisfies a defined access privilege criterion, verifying the first user equipment is authorized to couple to an intercom device of the set of devices; and
        in response to the verifying and determining that that the second user equipment is coupled to the femto access point device, facilitating a communication associated with the call via the intercom device,
        wherein the communication associated with the call bypasses a macro network device of a macro network.

2. The system of claim 1, wherein the modifying comprises assigning a first access privilege to the first user equipment in response to determining that the first user equipment is located at a first location within the coverage area and assigning a second access privilege to the first user equipment in response to determining that the first user equipment is located at a second location within the coverage area, wherein the first access privilege represents a first authorization to access a first subset of the set of devices and the second access privilege represents a second authorization to access a second subset of the set of devices.

3. The system of claim 1, wherein the operations further comprise:
    in response to the determining that the first user equipment is in communication with the femto access point device, mapping number data assigned to an intercom handset device with identifier data associated with the first user equipment, and
    based on the mapping, facilitating, a transmission of information, directed to the intercom handset device, to the first user equipment.

4. The system of claim 1, wherein the call is a first call and the operations further comprise:
in response to the determining that the first user equipment is coupled to the femto access point device, assigning a private branch exchange extension number to the first user equipment, wherein the private branch exchange extension number is not associated with a private branch exchange handset device of a private branch exchange network that is coupled to the local area network, and
redirecting, to the first user equipment, a second call that is directed to the private branch exchange extension number.

5. The system of claim 1, wherein the operations further comprise:
based on monitoring the set of the devices, determining log data associated with the set of the devices, and
in response to verifying, based on the access privilege data, that the first user equipment is authorized to access the log data, facilitating a presentation of the log data via the first user equipment.

6. The system of claim 1, wherein the call is a first call and the operations further comprise:
in response to the determining that the first user equipment is coupled to the femto access point device, assigning a private branch exchange extension number to the first user equipment, wherein the private branch exchange extension number is associated with a private branch exchange handset device of a private branch exchange network that is coupled to the local area network, and
subsequent to the assigning, redirecting, to the first user equipment, a second call directed to the private branch exchange handset device.

7. The system of claim 1, wherein the operations further comprise:
receiving, from the first user equipment, instruction data to control an operation of a device of the set of devices, and
facilitating a control of the device based on the instruction data, wherein the facilitating is independent of transmitting the instruction data via the macro network device.

8. The system of claim 1, wherein the operations further comprise:
facilitating a transfer of a streaming video output from a device of the set of devices to the first user equipment via the femto access point device without employing the macro network device.

9. The system of claim 7, wherein the operations further comprise:
determining display data associated with a functionality of the device, and
facilitating a presentation of the display data via the first user equipment, wherein the instruction data is received as a function of the presentation.

10. The system of claim 1, wherein the modifying comprises modifying the access privilege data to deny the first user equipment access to a device of the set of devices in response to determining, based on the location data, that the first user equipment is located at a specified location within the coverage area.

11. The system of claim 1, wherein the modifying comprises
modifying the access privilege data based on timing data that represents a time of day.

12. The system of claim 1, wherein the modifying comprises modifying the access privilege data based on defined policy data.

13. A method, comprising:
in response to receiving, from a first user equipment coupled to a femto access point device, a call directed to a second user equipment, verifying, by a system comprising a processor, that the second user equipment is coupled to the femto access point device;
in response to the verifying and based on location data representing that a location of the first user equipment is within a coverage area of the femto access point device, adjusting, by the system, access privilege data assigned to the first user equipment, wherein the privilege data represents an authorization of the user equipment to access, from the location, a set of devices of a local area network that is coupled to the femto access point device; and
in response to determining, based on the access privilege data being determined to satisfy a defined privilege criterion, that the first user equipment is authorized to access an intercom device of the set of devices, facilitating, by the system, an establishment of the call between the first user equipment and the second user equipment via the intercom device, wherein the facilitating comprises facilitating the establishment of the call independent of employing a macro network device of a macro network.

14. The method of claim 13, further comprising:
subsequent to determining that the first user equipment has exited a coverage area of the femto access point device, facilitating, by the system, a transmission of absence information indicative of a disconnection of the first user equipment from the femto access point device, wherein the facilitating comprises facilitating the transmission to a device of the set of devices.

15. The method of claim 13, further comprising:
mapping, by the system, first identifier data indicative of the first user equipment with first number data indicative of a first intercom number and second identifier data indicative of the second user equipment with second number data indicative of a second intercom number.

16. The method of claim 13, further comprising:
receiving, by the system, instruction data from the first user equipment to control an operation of a device of the set of devices.

17. The method of claim 16, further comprising:
based on the access privilege data, facilitating, by the system, a transfer of the instruction data to the device via the femto access point device independent of directing the instruction data to the macro network device.

18. The method of claim 13, further comprising:
based on input data provided via an interface of the first user equipment determining, by the system, determining the location data.

19. A computer-readable storage device comprising executable instructions that, in response to execution, cause a system comprising a processor to perform operations, comprising:
determining that a first user equipment coupled to a femto access point device has initiated a call with a second user equipment;
modifying, based on location data indicative of a location of the first user equipment within a coverage area of the femto access point device, privilege data assigned to the first user equipment, wherein the privilege data represents an authorization of the user equipment to access, from the location, a set of devices of a local area network that is coupled to the femto access point device; and in response to determining that the second user equipment is coupled to the femto access point device and verifying, based on determining that the access privilege data satisfies a defined privilege criterion, that the first user equipment is authorized to access an intercom device of the set of devices, facilitating a transmission of notification data associated with the call from the first user equipment to the second user equipment via the intercom device, wherein the transmission bypasses a macro network device of a macro network.

20. The computer-readable storage device of claim 19, wherein the operations further comprise:
determining the location data based on global positioning system data received from global positioning system device.

* * * * *